(12) United States Patent
Tibsherany

(10) Patent No.: US 11,687,499 B2
(45) Date of Patent: Jun. 27, 2023

(54) SCALABLE CRYPTOCOSM PLATFORM

(71) Applicant: Zobocoo, LLC, Flagstaff, AZ (US)

(72) Inventor: George F. Tibsherany, Flagstaff, AZ (US)

(73) Assignee: Zobocoo LLC, Flagstaff, AZ (US)

(*) Notice: Subject to any disclaimer, the term of this patent is extended or adjusted under 35 U.S.C. 154(b) by 487 days.

(21) Appl. No.: 16/921,456

(22) Filed: Jul. 6, 2020

(65) Prior Publication Data

US 2021/0026814 A1   Jan. 28, 2021

Related U.S. Application Data

(60) Provisional application No. 62/878,722, filed on Jul. 25, 2019.

(51) Int. Cl.
| | |
|---|---|
| *H04L 9/00* | (2022.01) |
| *G06F 16/182* | (2019.01) |
| *H04L 9/06* | (2006.01) |
| *G06Q 10/10* | (2023.01) |
| *H04L 9/32* | (2006.01) |
| *G06Q 10/067* | (2023.01) |
| *G06Q 50/16* | (2012.01) |

(52) U.S. Cl.
CPC ....... *G06F 16/1837* (2019.01); *G06Q 10/067* (2013.01); *G06Q 10/103* (2013.01); *H04L 9/0637* (2013.01); *H04L 9/3263* (2013.01); *G06Q 50/16* (2013.01)

(58) Field of Classification Search
None
See application file for complete search history.

(56) References Cited

U.S. PATENT DOCUMENTS

2020/0195436 A1* 6/2020 Khan ................ G06V 30/40
2021/0272145 A1* 9/2021 Tarmann ............. H04L 9/3239

* cited by examiner

*Primary Examiner* — Tuankhanh D Phan
(74) *Attorney, Agent, or Firm* — Brian M. Kaufman; Robert D. Atkins; Patent Law Group:Atkins and Associates, P.C.

(57) ABSTRACT

A scalable cryptocosm platform has a first data structure comprising a plurality of geographic blocks. A first blockchain has a plurality of property profiles. Each of the plurality of property profiles includes a first connection to one of the geographic blocks. A second blockchain comprises a plurality of occupant profiles. Each of the plurality of occupant profiles includes a second connection to one of the property profiles. The plurality of occupant profiles can include an individual profile, a business profile, and an essential services profile.

28 Claims, 23 Drawing Sheets

SCALABLE CRYPTOCOSM PLATFORM

CLAIM OF DOMESTIC PRIORITY

The present application claims the benefit of U.S. Provisional Application No. 62/878,722, filed Jul. 25, 2019, which application is incorporated herein.

FIELD OF THE INVENTION

The present invention relates in general to an enhanced computer system and, more particularly, to a scalable cryptocosm platform and associated systems and methods.

BACKGROUND OF THE INVENTION

A computer system provides an opportunity to find and engage in personal and professional connections, share and exchange information, and perform commercial transactions. People routinely need local products and services and turn to computer technology to find a supplier with relevant goods or services having the desired attributes. A computer system provides an opportunity to share and exchange information about providers of goods and services, and to offer goods or services for sale. The availability and access to connections and information continue to expand with higher bandwidth internet, more storage space, mobile devices, and faster computing platforms.

Consider a situation where a user needs a service, e.g., transportation to a doctor appointment, daycare for child or elderly person, home repair, or personal assistant. The user may conduct an internet search, often many repeated internet searches, to find a service provider. A competent, reliable, cost effective service provider can be difficult to find. The user parses through options, interviews candidates, reads reviews and feedback, if still unconvinced as to a good service provider, conducts more internet searching. The user may easily have to visit 10-20 websites to narrow down the choices to a single service provider, wasting both the user's time and valuable computer resources.

In some cases, an app may exist for the user's particular need. For instance, one app may be used for personal transportation such as a taxi or ridesharing app, another app could be used to find someone to walk the user's dog, maybe a third app is used to find laundry service, a fourth app used to arrange landscaping service, and a fifth app to purchase groceries. The list of available middleman apps goes on and on and can quickly become overwhelming when the totality of a user's local needs are considered. Middleman apps that consumers use to arrange particular services are limited in that each app is generally only used for a particular type of service. Users end up with copious apps installed that each separately track the user's activities, eat up limited resources, and slow down their phones or computers.

Whether an app or a website is used, the user's personal and financial data is being constantly collected by each website or app. A user may be tracked by dozens or even hundreds of different companies. The collection of data is not only a privacy concern for users, but a potential liability for service providers. All that data is ripe to be gathered by hackers in a data breach. Another downside of the proliferation of different websites and apps is the need to remember hundreds of usernames and passwords for every app or website used. Managing so many credentials becomes unwieldy if not impossible.

Computer technology itself does not necessarily or inherently solve the problem. Computers are already being used every day by consumers to transact business and satisfy needs for goods and services. However, a problem exists in the incredible inefficiency in use of both the user's and the suppliers' computer resources. The vast amounts of information and resources available with computer search tools and electronic communication links to almost every information source out there can make the simplest of tasks quite complex. Users must still navigate through many options and potential service providers to find someone that meets their needs. If a previous internet search does not yield an acceptable service provider, then additional searches on multiple websites and apps are typically performed before a decision can be made for a particular service provider.

Again, much computing time and resources can be wasted in trying to match the right service provider with the right customer, or by having many apps running in the background even when not needed, which is why the problem is specific to the realm of computer networks and computer technology. Many repeat searches are conducted and offers are made to hit the decision threshold to select a service provider. The ad hoc approach to the information searching is difficult for users and places a burden on the computer systems. The proliferation of middleman apps creates a technical problem in need of a solution. The information is disorganized, inaccurate, and does not permit efficient operation of the computer systems. The computer system does not function in an optimal manner. The computer network utilization suffers, particularly with a large population doing the same inefficient and repetitive searching and evaluation of service providers.

In the app and website centric transaction model currently in use by consumers, big data companies own, control, and capitalize on the individual's data. Individuals have a hard time finding, interacting, and transacting local needs. Their email inboxes are bombarded by junk email, they are required to memorize hundreds of usernames and passwords to access their own data, and then they have their personal and financial data stored in innumerable private servers available for hackers. Currently, individuals typically spend 84% of their family's budgets locally, using thousands of ineffective cloud-based search apps and mediums only to find a few local needs results. Therefore, a need exists for a scalable cryptocosm platform.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

An enhanced computer system with associated data and organizational structures would facilitate users to find, interact, and transact all of their local needs, in real time 24/7, from a single account with a single login username and password, or without a password at all. Demand, supply, and delivery would all be coordinated seamlessly by a single system. All of the user's personal data would be distributed and stored securely in a blockchain where the data is usable only with the user's permission and safe from hackers. Financial transactions would be completed without the need to exchange financial information between the seller and purchaser.

Figure 1:
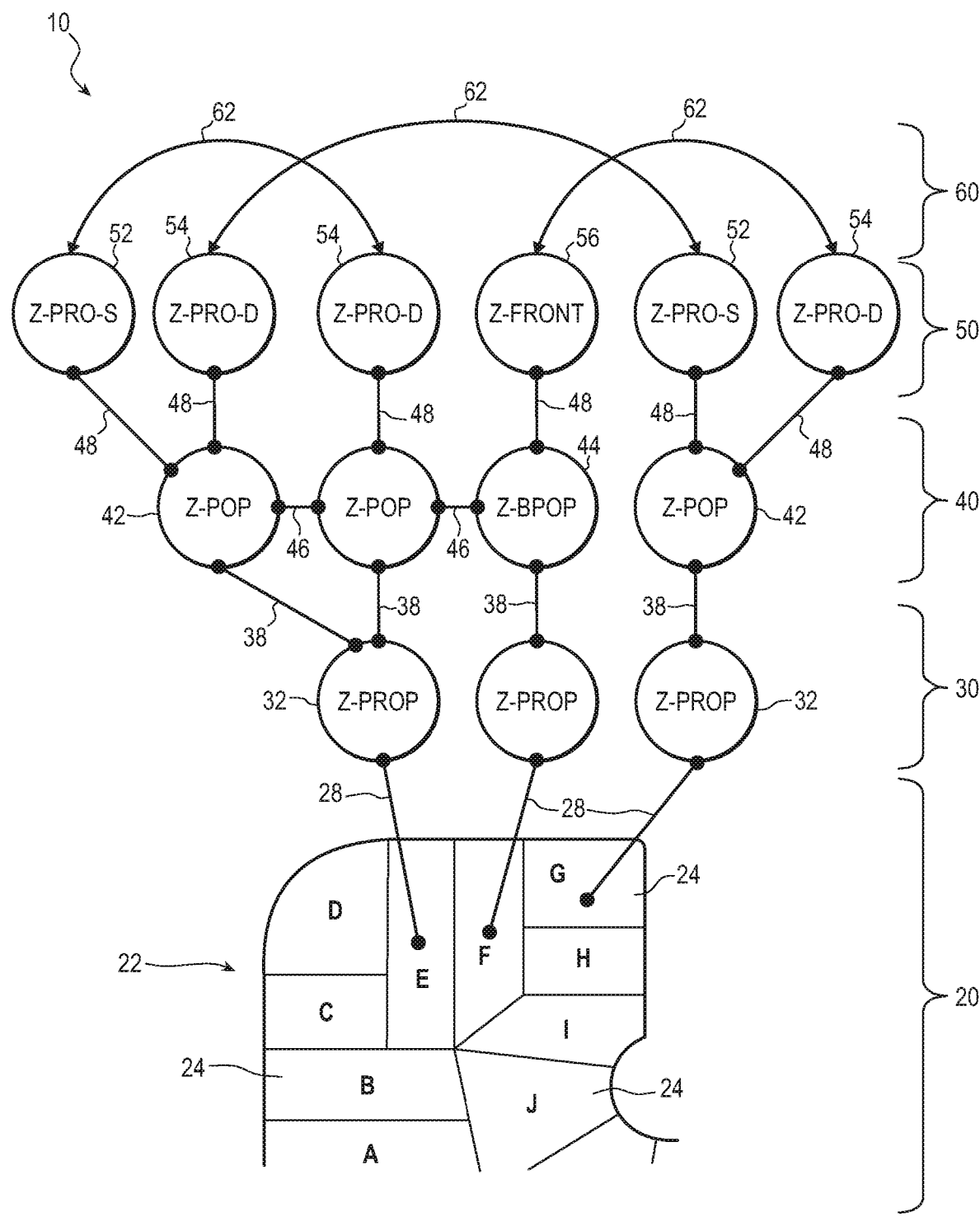
FIG. 1 illustrates a cryptocosm architecture.

FIG. 1 shows the architecture of a portion of a scalable cryptocosm platform 10 with a plurality of operational levels. Parcel layer 20 is the lowest level and represents physical locations in the real world as data structures within cryptocosm 10. Parcel layer 20 is illustrated as a map 22 because most local governments split up property as parcels. Parcel layer 20 can be a data structure defining geographic space on the Earth's surface in any suitable format. Data defining each parcel for an area that cryptocosm 10 operates in is stored as a parcel file or z-base 24 in a database on a central server or distributed in a peer-to-peer manner through a blockchain, distributed hash table, or other suitable technology. Z-bases 24 are illustrated as geographic shapes in FIG. 1 to better illustrate their use but would be stored as binary or textual data in the database.

Many elements in this specification have names beginning with "z-" followed by a short descriptor to indicate elements that exist as data structures within cryptocosm 10. The data for z-bases 24 can be in geographic information system (GIS) format or any other format suitable for representing special and geographic data. The data can be acquired and input into cryptocosm 10 automatically from publicly available sources such as government websites or databases. In some cases, publicly available data may need to be processed to generate data in the desired format, e.g., by converting an image file to geographic coordinates.

Parcel layer 20 will include a z-base 24 for each parcel of land in the area being covered by cryptocosm 10, e.g., an entire city, county, state, or country. Cryptocosm 10 has a property layer 30 above parcel layer 20. The term "above" indicates that property layer 30 is above parcel layer 20 conceptually within the architecture, but does not indicate a physical relationship within cryptocosm 10. The actual data structures for property layer 30 and parcel layer 20 may be intermixed in a common storage medium or stored in separate storage media located in any arbitrary location relative to each other.

Property layer 30 includes a plurality of z-props 32, which are data structures that store characteristics of properties. The descriptor 'prop' in z-prop 32 is short for property. Each z-prop 32 is linked to a z-base 24 by a connector 28. Connector 28 is a pointer within each z-prop 32 that indicates which z-base 24 that particular z-prop is associated with. Alternatively, connectors 28 can be a pointer to a z-prop 32 within a z-base 24, both a z-prop and a z-base can point to each other, or connectors 28 can be data structures separate from the z-props and z-bases.

Each z-prop 32 is a data structure that stores relevant information for the underlying parcel of land represented by the connected z-base 24. Z-props 32 provide a real time accurate digital record of property attributes as well as property improvement attributes of the underlying parcel. For instance, the z-prop 32 will indicate any buildings, walls, and other improvements that have been constructed on the parcel. Construction dates, heights, lengths, square footages, etc. are all be stored within z-prop 32. Building plans can be stored as data files where available.

Z-props 32 contain information related to essential services providers that provide services to the respective real property, such as available garbage pickup providers, cable providers, telephone providers, which entities provide the water and power, etc. Z-props 32 can include identifications of regulatory bodies that have jurisdiction over the underlying parcel, e.g., city governments, homeowners' associations (HOAs), property owners' associations (POAs), and special governmental districts, as well as any fees associated with the bodies. Zoning classifications can be stored as well. Any attribute of the property can be stored as part of a z-prop 32.

Z-props 32 can be updated in real time by monitoring local government websites via an application programming interface (API), webcrawler, or other mechanism to determine when a property is improved. Most cities will require a permit be acquired for any significant improvement project. A computer connected to cryptocosm 10 can monitor the city's public records and add a project as pending when a permit is issued, then mark the improvement as complete when a certificate of occupancy is issued. The algorithm for adding improvements in real time from regulatory bodies can be customized for the regulatory scheme in place at the particular locality.

Z-props 32 can also be updated manually by the entity that owns or operates cryptocosm 10. For instance, a team of employees can be hired to build up property information full time. The team can drive to parcels with missing information to determine the status of the property. The team may also work directly with commercial and multi-family property owners to determine amount and types of units available on the property and input the data as z-props 32. The topology in FIG. 1 is valid for a neighborhood with single family residences, where each parcel has a single property use. Commercial property and multi-family properties, where several habitable units occupy a single parcel, utilize a more complex topology as explained below with reference to FIG. 3b.

Occupant layer 40 sits above property layer 30. Occupant layer 40 consists of a plurality of z-pops 42 and z-bpops 44. Pop in the context of z-pops is short for portal page, but z-pops 42 operate more like individual profiles. Z-pops 42 represent an individual member of cryptocosm 10, and operate as a unique digital identity and a portal for the individuals into the cryptocosm. Z-pops 42 are data structures that store information specific to the associated individual user. Personal information can be stored, such as name, birthday, or hair color. Financial information is also stored, such as details of payment methods, past completed transactions, etc.

Z-pops 42 have connections 38 that link each z-pop to a respective z-prop 32. The connection 38 to a z-prop 32 serves to associate individual users, via their z-pops 42, to real properties, as represented by their respective z-props. As with connections 28, connections 38 can be data pointers within z-props 32, within z-pops 42, or both, or could be a completely separate data structure from the connected z-pop and z-prop. Connections 38 can include detailed information beyond simply associating a user with a property. For instance, connections 38 would typically store a type or other properties or attributes of the connection, e.g., homeowner, renter, landlord, etc. Multiple z-pops 42 can be connected to a common z-prop 32 if each has a relationship to the property, e.g., cohabitating individuals or landlord and tenant. Z-pops 42 can also have connections 46 between z-pops to define relationships between users. For instance, a husband, wife, and daughter might be associated by connections 46 to identify a family unit.

Z-bpops 44 are business portal pages, i.e., profiles. The letter b is a modifier to indicate that the portal page is similar to normal z-pops but meant for businesses. Other types of portal pages will be described below. Z-bpop 44 represents a business that operates out of an associated property represented by a z-prop 32. Z-bpops 44 are similar to z-pops 42, but store information specific for businesses, such as state of incorporation, entity type, officers, etc. Statements about z-pops 42 are generally applicable to any of the several different types of portal pages, e.g., z-bpops 44, unless the statement clearly applies only to individual users and not businesses or other entities with a custom pop type. Other types of portal pages that represent organizations rather than individual users, such as for essential service providers or government entities, are very similar to z-bpops 44. Even though essential service providers are given the nomenclature z-epops, and other types of organization's profiles pages may have different nomenclatures, anything herein said for z-bpops or any other type of profile page is also true for all types of organizational profile pages.

Connection 38 links the data structures of z-bpops 44 to data structures of z-props 32 to pin businesses down to real property and physical locations. Connections 46 can be used to associate z-pops 42 to z-bpops 44, or any other entities within occupant layer 40. Connections 46 to z-bpops 44 can be used to indicate ownership of a company by an individual z-pop 42, employment of the individual by a company, or any other suitable purpose. The connection 46 data structure can indicate the type of relationship, as well as storing other properties and attributes of the relationship connection. A connection 46 can be created between a plurality of z-bpops 44 to indicate a relationship between companies, e.g., to indicate a parent company's ownership of a subsidiary. Z-pops 42 and z-bpops 44 are connected and linked to each other by connections 46 on cryptocosm 10 as a secure decentralized peer-to-peer platform enabling seamless interaction and transactions without the need to share emails, usernames, or passwords.

Need finder layer 50 sits above occupant layer 40, and consists of data structures that represents supply and demand of the underlying z-pops 42. A z-pro-s 52 or z-pro-d 54 is a profile of a supply or a demand that a z-pop 42 has. Z-pro-s 52 are supply profiles, as indicated by the -s suffix in the figure, and z-pro-d 54 are demand profiles, as indicated by the -d suffix. A user generates a z-pro-s 52 or z-pro-d 54 via their z-pop 42 profile page. The z-pro 52 or 54 is then associated with their z-pop 42 within the data schema by connections 48.

Z-pros 52 and 54 are very similar. Both define some product or service in a similar fashion. The product or service is defined by a title or general descriptor of the product or service, e.g., furniture, love seat, bed, wall art, computer repair, plumbing, car repair, etc., and optional attributes that further defines the scope of the supply or demand. The attributes can be anything that is a further limitation within the title, e.g., for a love seat two attributes could be material of the couch and color. Z-pros 52 and 54 can have all the same attributes, the difference being whether someone has a demand, i.e., is looking to buy the product or service, or has a supply, i.e., has the product or service for sale.

Rather than generating a z-pro-s 52 supply profile for every good or service offered by a business, which is possible, a z-bpop 44 can generate a z-front 56. Z-front 56 is a storefront within cryptocosm 10. Z-front 56 defines the full range of products and services offered by the business represented by the connected z-bpop 44. Z-front 56 can define attributes, pricing, availability, and other terms of each product or service offered. A department store could also have multiple z-fronts 56 to represent the different departments, e.g., one z-front for electronics, another for home goods, and a third for kid toys.

Need finder layer 50 is responsible for connecting a local individual's need, represented by a z-pro-d 54 demand profile, with a local supply, represented as a z-pro-s 52 supply profile or a z-front 56. Since over 85% of a family's budget is spent on local needs, the local community's greatest need is the ability to find and choose the best choice just like shopping online marketplaces. Need finder layer 50 provides the capability to satisfy all of a person's local needs.

Transaction layer 60 exists above need finder layer 50. Cryptocosm 10 includes algorithms, described in detail below, to match supplies to demands within need finder layer 50, which are then transacted within transaction layer 60. A z-pro-d 54 demand profile is satisfied by either a z-pro-s 52 supply profile generated by an individual z-pop 42, or by a z-front 56 generated by a z-bpop 44. A transaction 62 data structure is generated to commemorate a completed transaction. In some embodiments, each transaction includes multiple data structures. The seller may generate an invoice or receivables data structure, a second data structure is created to represent payment from the buyer to the seller, and a third data structure can be created to represent transfer of the good or service from the seller to the buyer.

A transaction 62 indicates the goods or services transferred from a supply to a demand, and an amount of money transferred from the demand to the supply in return. Transaction 62 can include any relevant details that may be useful to record for later reference. For auto repair services, the transaction 62 data structure can include parts replaced, other recommended repairs, or maintenance reminders. For medical services, transaction 62 can store any recommendations, diagnoses, test results, prescriptions, etc. The records of transactions 62 within cryptocosm 10 can operate as medical records for both patient and provider.

Transactions 62 can be stored as a single data structure connected to both the supply entity and demand entity within occupant layer 40. Transactions 62 can be encrypted in a manner that both the supply and demand z-pop 42 can decrypt the information, or a separate data structure can be created for each party to the transaction to simplify the cryptography.

Typically, to create and launch cryptocosm 10, the lower levels are created first and then subsequent layers are filled in on top of the lower levels. While specific order of building up cryptocosm 10 is described, the same final system could be formed in other orders of steps. Higher levels can be formed first, or all levels can be generated together.

Figure 2:
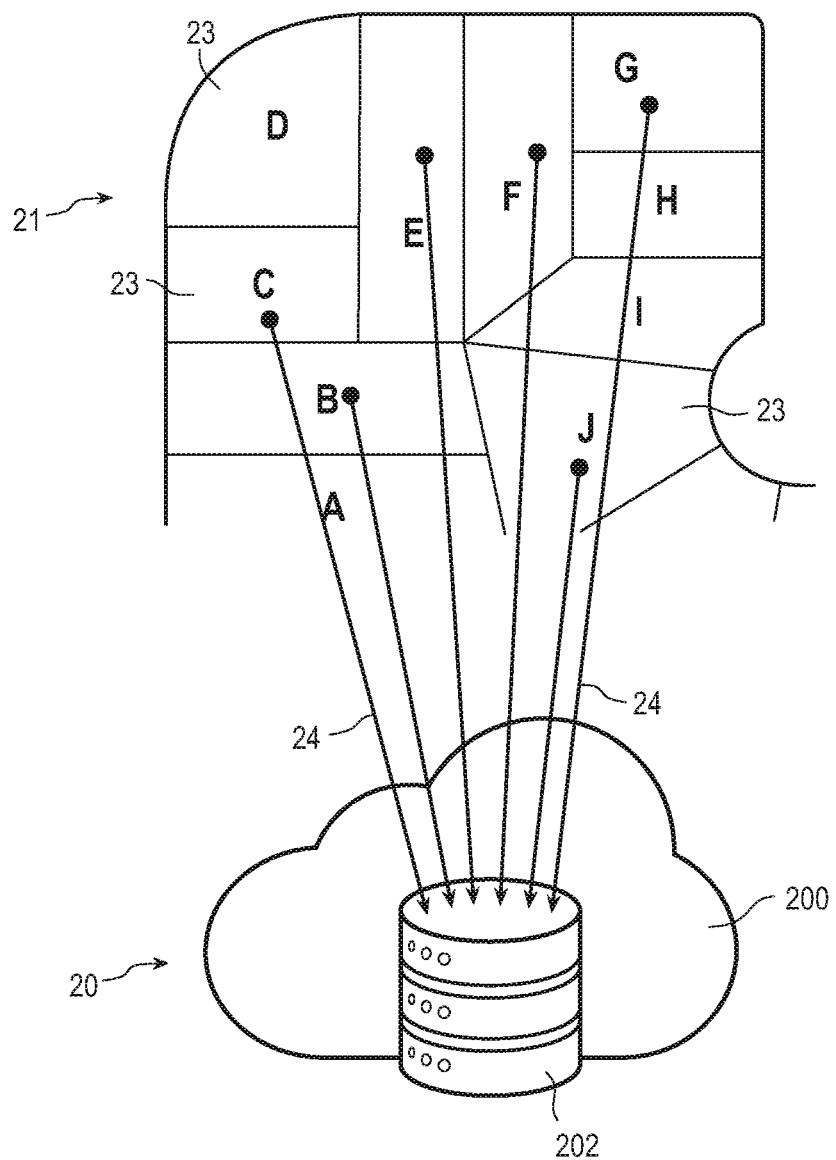
FIG. 2 illustrates creating a parcel data layer.

FIG. 2 illustrates a process of constructing parcel layer 20 as an initial step. Parcel map 21 represents raw data from a government entity responsible for recording land ownership, whereas map 22 from FIG. 1 was a representation of data already stored as part of cryptocosm 10. Parcel map 21 at a minimum has a geographic point for each physical parcel 23 within a larger geographic area, which is the primary concern for parcel layer 20. The function of parcel layer 20 is to allow linkage of other cryptocosm 10 elements back to physical locations in the real world. Typically, multiple geographic points for each physical parcel 23 would be included to define a boundary of each parcel.

The data from parcel map 21 is stored on a hard disk, compact disc (CD), digital versatile disk (DVD), Universal Serial Bus (USB) thumb drive, or other suitable medium after being acquired from the government entity on said medium or downloaded from a website of the government entity. The input data may be received by private entities that collect and sell data rather than governments.

A computer program automatically processes parcel map 21 and generates z-base 24 parcel records for storage in cloud server 200 on a database 202 or other suitable data structure. Cloud server 200 is a representation of computer hardware that exists within a hosting facility at any arbitrary location. The server can be owned and operated by a company running cryptocosm 10 or rented for a fee. Database 202 can be distributed or replicated across a plurality of individual computer servers that together constitute cloud 200.

Z-bases 24 include data describing the geographic location of a particular physical parcel 23. The specific data being stored may depend on the specific data available for a geographic region. Different government authorities will have data available in varying formats or resolutions. Raw input data can be stored in z-bases 24. In some embodiments, input data is converted into a standard format for z-bases 24 regardless of the input data received. To reduce storage requirements, only a single geographic coordinate or a reduced set of coordinates is stored for each parcel in other embodiments.

Database 202 is a relational database, such as an SQL or Microsoft Access database. In other embodiments, another type of data storage medium is used that allows lookup of a z-base 24 given one or more known attributes about the parcel. Each z-base 24 can be looked up by geographic coordinate, and the correct record is returned from database 202 even if the exact coordinate entered is not specifically stored as part of the record. For instance, if only boundary coordinates are stored as part z-base 24, the record is still searchable using internal coordinates. In addition, each z-base 24 will include a z-base index, a unique identifier that will allow the record to be pointed to specifically within database 202. The index will be used by connectors 28 to link z-props 32 directly to a specific z-base 24, allowing the z-base to be looked up in database 202 very quickly to learn the geographic location of a z-prop.

Typically, city and county government records include a significant amount of extra data for each parcel that will be stored in z-props 32 later. Extra data besides only geographic coordinates can be stored in z-bases 24, but the data in the z-bases is typically limited to geographically descriptive data, and other data that is not normally subject to change. Other data about the property that is subject to change is stored in z-props 32. Example of typical data that can be stored in z-bases 24 or z-props 32 includes section, township, and range information, subdivision, lot number, lot size, or government record numbers. The function of a z-base 24 is specifically to provide a link to a geographic location in the real world, so typically only information that is relevant to that goal is stored.

Storing a link back to the government records within z-bases 24 will be helpful in keeping the data up to date. The link to the government record can be a web hyperlink, a government record number, a database index pointer from the government database, or any other suitable link type. The government records can automatically be periodically checked to incorporate any changes into database 202 or a connected z-prop 32.

Figure 3A:
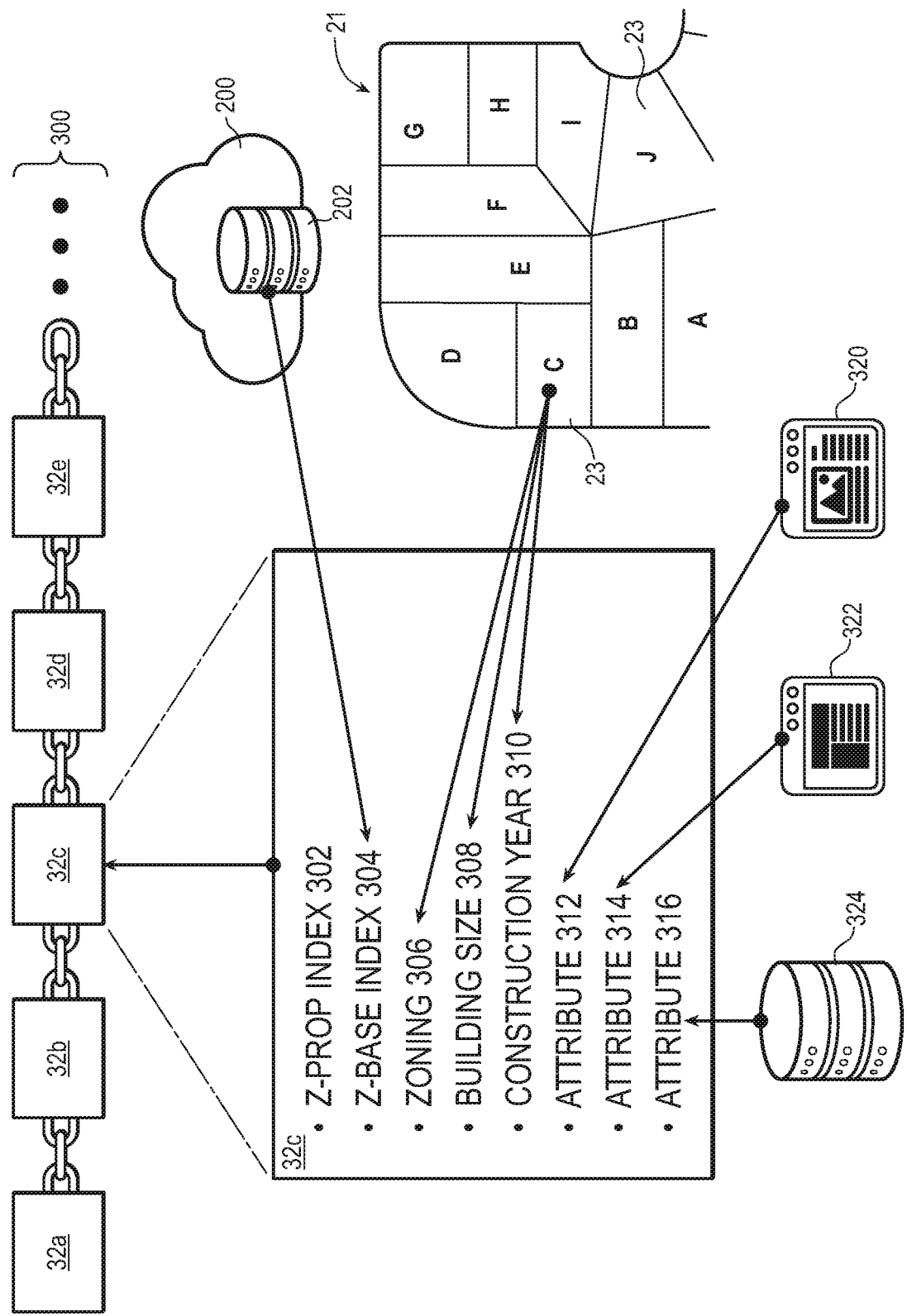
FIGS. 3a and 3b illustrate creation of a property data layer.

Property layer 30 is formed on top of parcel layer 20. The entity creating cryptocosm 10 can create a corresponding z-prop 32 for each z-base 24 as the z-bases are created, or the z-props can all be created as a separate step once parcel layer 20 is completed, or the z-props can be created ad-hoc as necessary. FIG. 3a shows the formation of property layer 30. The data structure of property layer 30 is formed as a blockchain 300. Other types of distributed ledgers are used in other embodiments. A relational database is used in some embodiments, but a distributed ledger is preferred. Z-props 32 are linked together in blockchain 300 like links of a chain as the z-props are created. The beginning of blockchain 300 is illustrated, with z-prop 32a being the first block. Each successive z-prop 32 is generated and then added as a block in the chain. In some embodiments multiple z-props 32 are grouped together in a single block to make more efficient use of blockchain 300.

A blockchain is a growing list of records, called blocks, that are linked using cryptography. Each block contains a cryptographic hash of the previous block, a timestamp, and a data payload. The data payload is typically transaction data in the common usage of a blockchain as a cryptocurrency but can include any suitable data, e.g., data describing characteristics of a property when the blockchain block includes a z-prop 32.

By design, a blockchain is resistant to modification of the stored data. Blockchains are open and distributed ledgers that can record data efficiently and in a verifiable and permanent way. A blockchain is typically managed by a peer-to-peer network collectively adhering to a protocol for inter-node communication and validating new blocks. Once recorded, the data in any given block cannot be altered retroactively without alteration of all subsequently added blocks because every cryptographic hash beginning with the modified block would have to be updated accordingly.

A key aspect of privacy in blockchains is the use of private and public keys. Blockchain systems use asymmetric cryptography to secure transactions between users. In these systems, each user has a public and private key. The two keys are random strings of numbers and are cryptographically related. It is mathematically impossible for a user to guess another user's private key from their public key. This provides an increase in security and protects from hackers. Public keys can be shared with other users in the network because they give away no personal data. Each user has an address that is derived from the public key using a hash function. These addresses are used to send and receive assets on the blockchain, such as cryptocurrency. Because blockchain networks are shared to all participants, users can view past transactions and activity that has occurred on the blockchain.

In the case of a transaction layer 60, transactions on the blockchains are transactions in real life where entities within occupant layer 40 have traded a currency for goods or services. In the case of occupant layer 40 or property layer 30, a transaction is the addition of a new z-prop 32 or z-pop 42, or modification of an existing entity in a new blockchain block.

FIG. 3a has a blown-up version of z-prop 32c to illustrate one of the z-props being generated. Each generated z-prop 32 is given a unique z-prop index 302. Z-prop index 302 is a unique identifier for the z-prop 32 being created, similar to z-base indexes for the z-bases 24. Z-prop index 302 can be stored in connected elements from any of the cryptocosm 10 layers, and allows the information within the particular z-prop 32 to be accessed quickly. Each z-prop 32 also includes a z-base index 304 as a pointer to the z-base 24 for the underlying parcel where the property exists in real life. Z-props 32 can be created in a programmatic loop, and the index of the next z-base 24 is pulled from database 202 for the z-prop being created. Z-base index 304 stored in z-prop 32 grounds the z-prop to a real location on the map. Z-base index 304 constitutes a portion or the entirety of connections 28 in one embodiment.

Besides indexes 302 and 304, z-prop 32c also stores a plurality of attributes that describe the property and improvements that have been made to the property. The attributes can come from a variety of sources illustrated in FIG. 3a. As discussed above, parcel map 21 represents raw data scraped from or provided by a government entity or third party. Typically, all publicly available data will be stored as part of each z-prop 32. As non-limiting examples, FIG. 3a shows zoning information 306, building footprint size 308, and building construction year 310 being pulled from parcel map 21 and stored in z-prop 32c. Other information that might be available with parcel map 21 includes street address, school district, building floorplan, value assessments, and electoral districts.

Information for z-props 32 can also be pulled from any arbitrary source of information available. FIG. 3a shows attributes 312, 314, and 316 being pulled from website 320, website 322, and database 324. Attribute can be pulled from websites using publicly available APIs or by using a web scraper to load the web page and grab the desired attribute. Websites 320 and 322 could be any website with information related to properties. For example, website 320 is a real estate database website that has historical or other data that is not included with the publicly available governmental data from parcel map 21. Website 322 is the website of an internet service provider or other essential services provider that shows whether services from the provider are available at the associated physical parcel 23 when the street address is entered. Any website that has useful information can be scraped and the information stored in z-prop 32.

Z-props 32 may also include data that is purchased or otherwise acquired. Database 324 represents data that is stored locally on the computer populating data into z-props 32. Database 32 can be data purchased or acquired from a municipality, other government entity, private data brokers, or any other source, that is not publicly available on a website or through an API. Any source of data that relates to attributes of properties in the geographical region being served by cryptocosm 10 can be imported at the time of creation of z-props 32. Purchased data can also be delivered via an API rather than a database 324. The sources, types, formats, and structures of source data for attributes in z-props 32 are not limited by the above examples. Any useful data from any source whatsoever can be stored in z-props 32.

Once a z-prop 32 is constructed with all available data for inclusion, the z-prop is added to blockchain 300 as part of the next block in the blockchain. By the nature of blockchains, data added to blockchain 300 is not modifiable. If an attribute of a z-prop 32 needs to be changed, for instance to indicate an increase in livable space after the completion of an addition to the house, the change is indicated in a new block added to the end of blockchain 300. The new block will reference the same z-prop index 302 to indicate the information relates to the same z-prop 32 even though stored in a different blockchain 300 block. All blocks will be timestamped so that the most recent data is recognized as the most up to date information for each z-prop 32

Because all previous data remains in blockchain 300, users of the blockchain can always look back and see the complete history of all attributes for each property. Z-prop index 302 operates like a vehicle identification number (VIN) to identify a real estate property. Extending the vehicle analogy, the historical data within blockchain 300 is comparable to a Carfax report that lists the history of the vehicle for a given VIN.

Some aspects required for a blockchain to work are left off of FIG. 3a to focus on the novel aspects of cryptocosm 10. Additional data will generally be required to be stored as part of the blocks of blockchain 300, e.g., a cryptographic hash of preceding blocks.

Figure 3B:
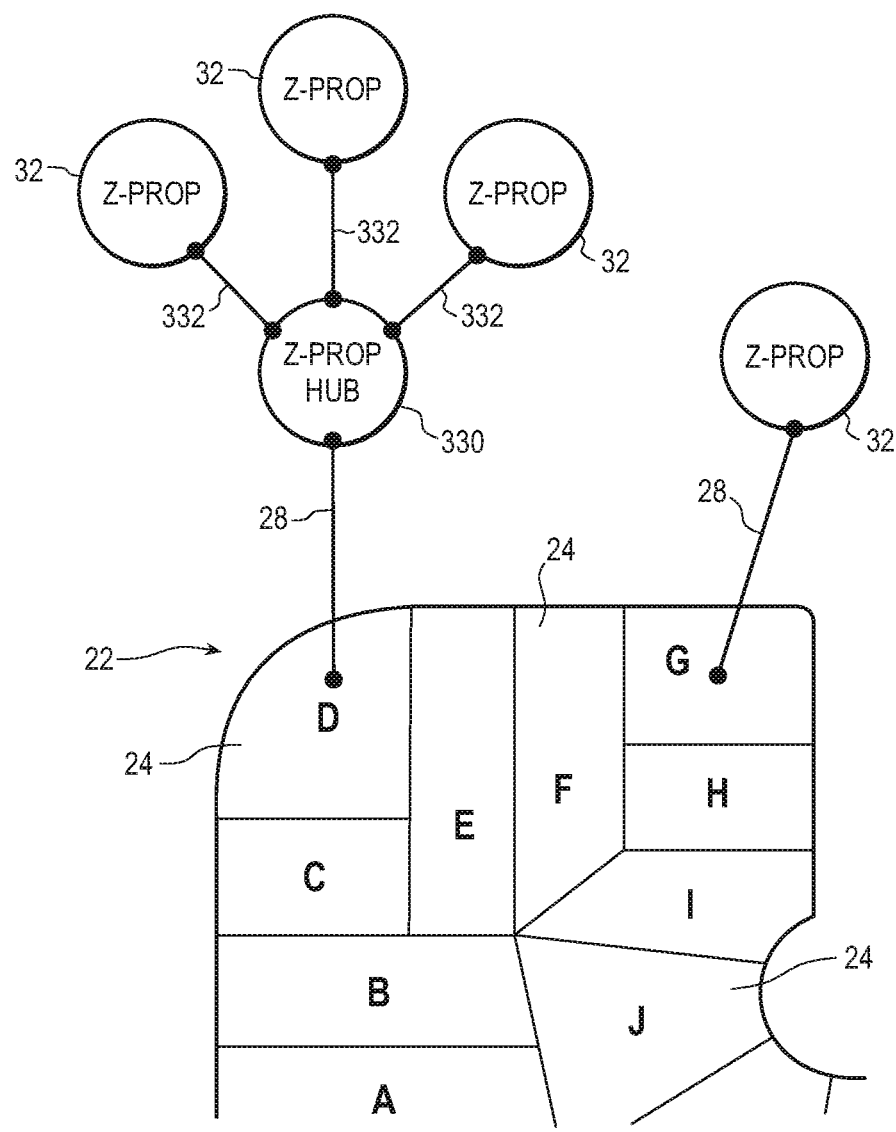

The workflow in FIG. 3a is appropriate for the simple example in FIG. 1, which is limited to single family residences and other situations where a single z-prop 32 per z-base 24 is sufficient. However, a significant portion of property use is more complicated. FIG. 3b illustrates a topology of property layer 30 usable for building z-props 32 on top of z-bases 24 in more complicated situations. A z-prop hub 330 is first created to represent the overarching property use. Z-prop hub 330 is, from a data structure standpoint, similar to z-props 32 in FIG. 3a. Z-prop hub 330 includes a z-base index 304 as part of connector 28 to link the hub to a geographic parcel. Z-prop hub 330 may also store the z-prop index 302 for each z-prop 32 connected to the hub as part of connections 332. Z-prop hub 330 stores attributes that apply to the property as a whole, such as zoning information, type of use, e.g., residential, commercial, or mixed-use, number of units, property management information, tenant fees, and any other relevant attributes or information. Z-prop hub 330 is stored in blockchain 300 along with z-props 32.

Z-props 32 are formed to represent the individual units, whether they are apartments, condos, storefronts, or another type of unit. Z-props 32 connected to z-prop hub 330 remain basically as described above with reference to FIG. 3a. Z-props 32 connected to z-prop hub 330 have their own z-prop index 302, as in FIG. 3a, and may also store the z-prop index 302 of z-prop hub 330 to create a connection 332 between the z-props and the z-prop hub. Z-props 32 may have a connection 28 to z-base 24 in addition to connection 332 to z-prop hub 330, or could be connected to the z-base only via the z-prop hub. Z-props 32 connected to z-prop hub 330 store information relevant to the specific unit, such as current tenant, square footage, location within the property, or floorplan details of the specific unit.

Using a z-prop hub 330 allows z-props 32 to be grouped together when the z-props share a common parcel. Z-prop hubs 330 can also be used to link properties together within an HOA, POA, or another organization of properties. The z-prop hub 330 for the HOA can be linked to each parcel that is part of the HOA, and also to each z-prop 32 for each homeowner in the HOA. A Z-prop hub 330 can be used to group z-props 32 for any suitable purpose, whether the z-props are directly geographically adjacent to each other or geographically remote.

Figure 4A:
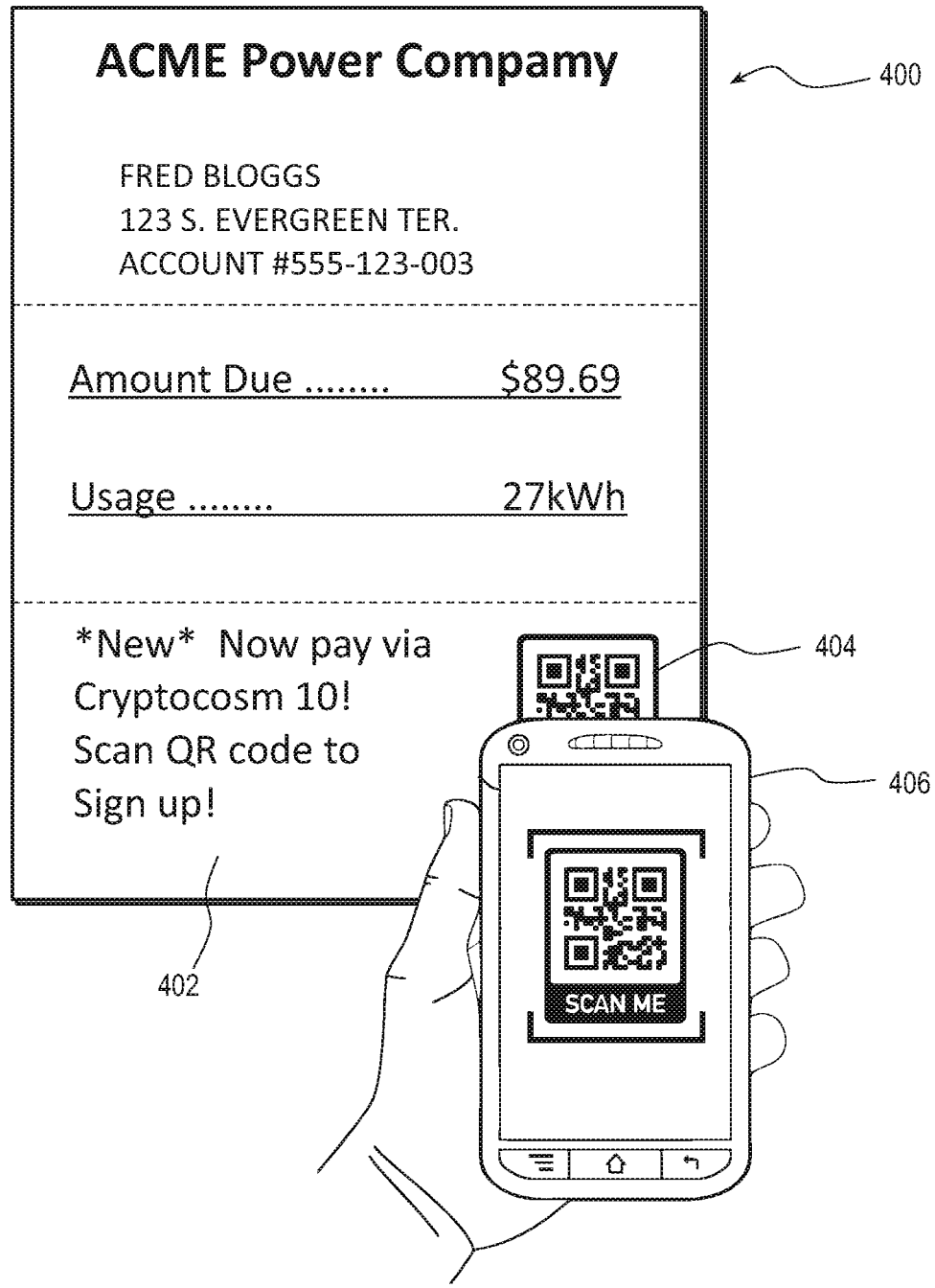
FIGS. 4a-4c illustrate creation of an occupant layer.
Figure 4B:
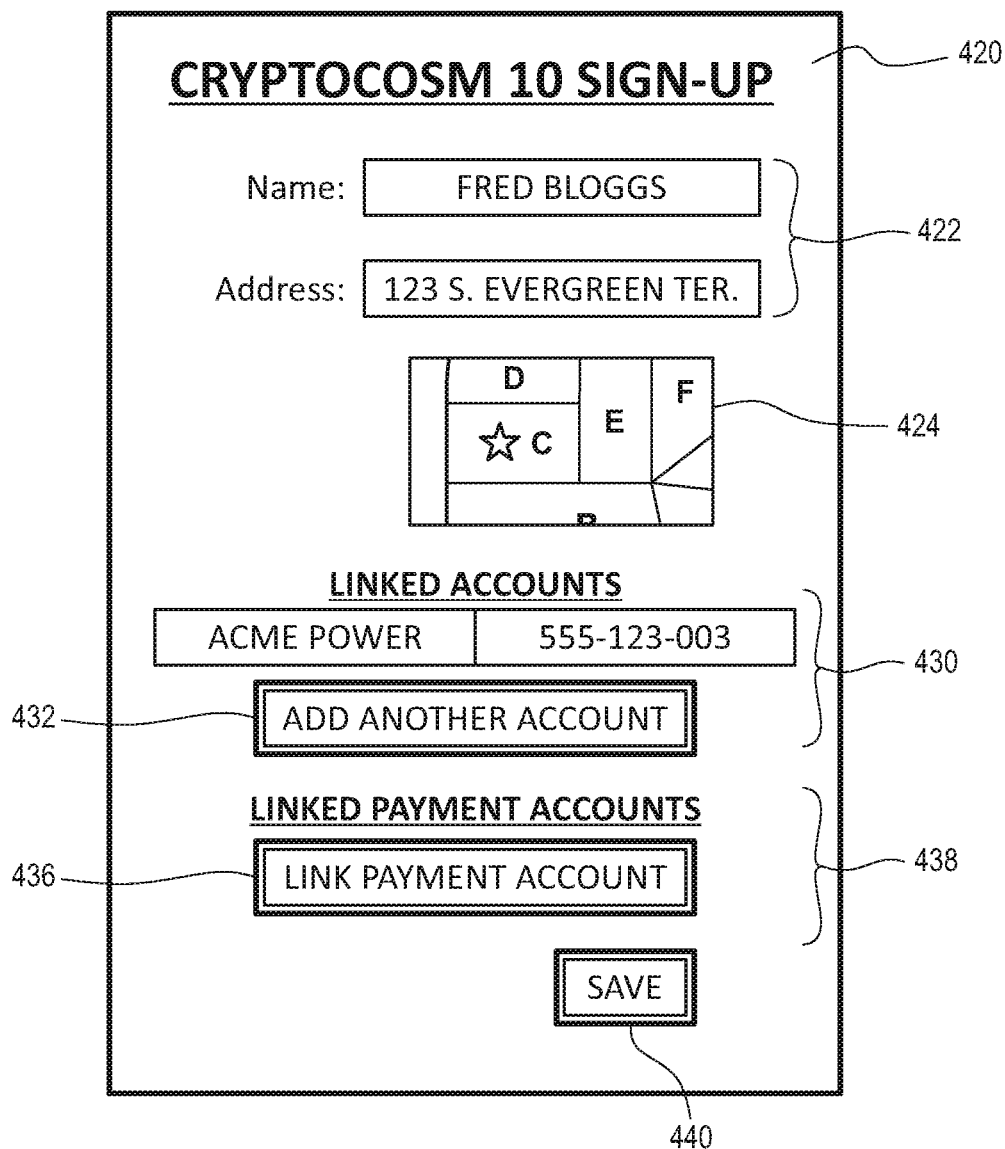
Figure 4C:
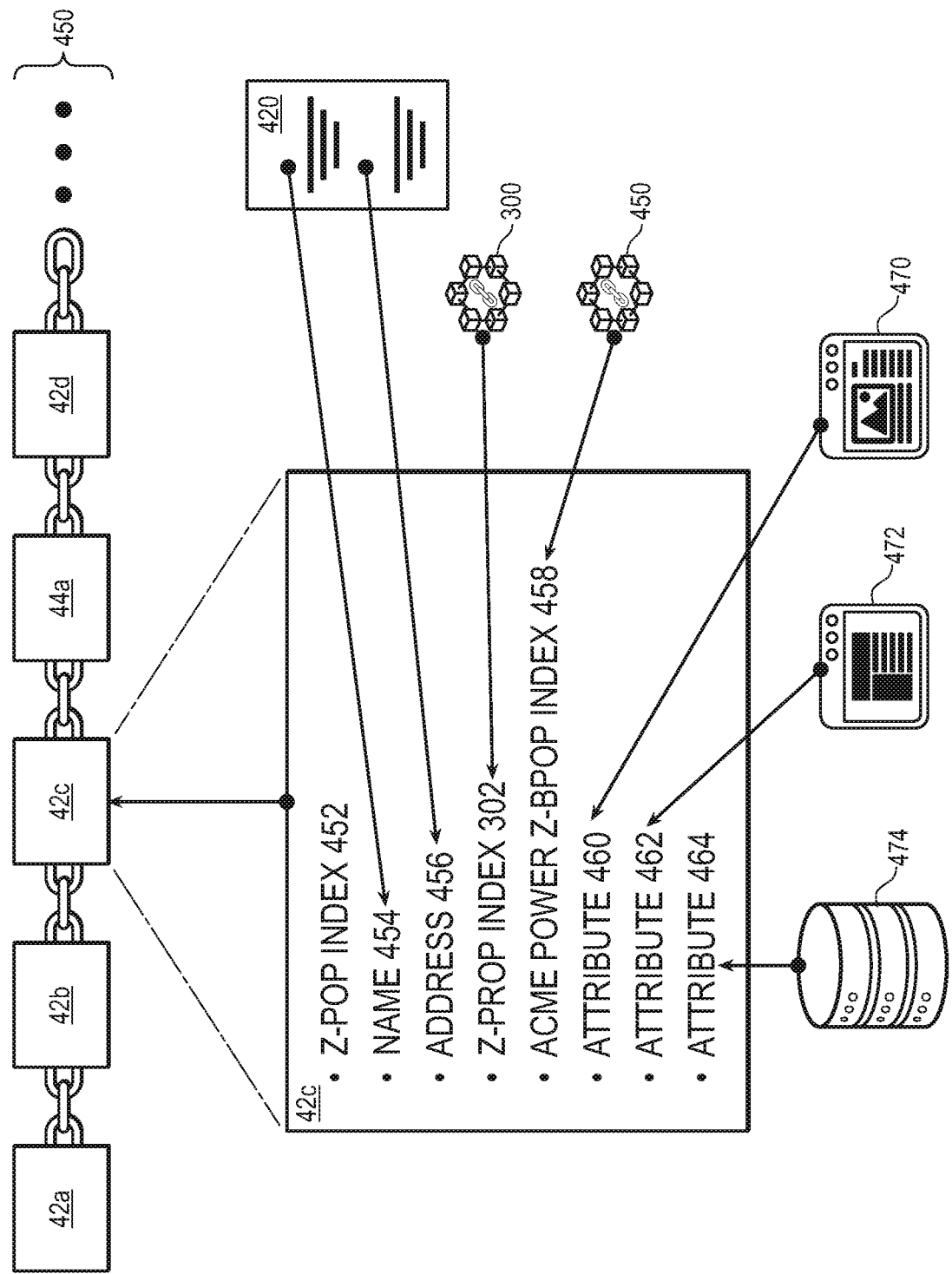

FIGS. 4a-4c illustrate formation of occupant layer 40 on top of property layer 30. Occupant layer 40 is typically formed on the fly as occupants sign up for cryptocosm 10.

An occupant can be any type of entity that occupies a property from property layer 30. The most common type of occupant is the individual user that lives in a house, condo, or apartment with a z-prop 32 in blockchain 300 of property layer 30. Occupants can also be businesses, government entities, essential services providers, or any other type of entity operating out of a home, storefront, commercial building, government building, or other property that has a z-prop 32 in blockchain 300.

Construction of occupant layer 40 can be performed on an ad hoc manner as occupants sign up. A z-pop 42 is created for each occupant during sign-up. Marketing campaigns can be used to encourage sign-ups. Individual users can access a sign-up website for cryptocosm 10 by clicking a weblink, entering a URL, performing a web search, by scanning a QR code within an advertisement placed by the company behind cryptocosm 10, or another suitable mechanism. A marketing campaign can be directed toward small businesses promoting the benefits of cryptocosm 10 for the businesses. Businesses can access a sign-up page in a similar manner to individual users, which results in a z-bpop 44 being created for the business.

Signing up businesses has the added benefit to cryptocosm 10 that the business's customers are encouraged to sign up as individual users by the business so that the business can increase the benefit received from the cryptocosm. If the business's customers sign up for cryptocosm 10, transactions between the business and customers become easier, cheaper, quicker, and more secure. Therefore, signing up businesses will help accelerate individual user sign-ups.

In order to get cryptocosm 10 off the ground initially, general advertising to potential individual users and small business may not be sufficient. Direct marketing to and negotiation with larger businesses can help provide an initial group of sign-ups rapidly to speed up achievement of critical mass for cryptocosm 10. Large businesses can be enticed through a business deal to either encourage or require their customers to sign up with cryptocosm 10 to continue transactions with the business. Other marketing ideas to quickly grow individual members of cryptocosm 10 include working with homeowners' associations or property owners' associations and running ads with a QR code on movie theater screens before movies.

Better yet, cryptocosm 10 can begin by signing up an essential service provider within a geographic region to be served by the cryptocosm. An essential service provider is a company or government entity that services every household in an area, whether by law or de facto. The classic example of essential services providers are the utilities that every house has. The company building up cryptocosm 10 can start by signing up at least one essential services provider in an area, e.g., the local power company. Power companies commonly have monopoly power and serve every individual in the geographic region served. By negotiating with a power company to require its customers to sign up for cryptocosm 10, occupant layer 40 can almost instantly sign up practically every individual in a geographic region.

FIG. 4a shows a power bill 400 from a hypothetical power company, ACME Power Company, to a hypothetical customer. The developers of cryptocosm 10 have negotiated with ACME Power Company to use the cryptocosm as the payment method for their customers. Power bill 400 has a return slip 402 that includes information on signing up for and paying through cryptocosm 10 rather than the usual instructions to mail in a check. Return slip 402 has a QR code 404 that the customer can scan using a camera on cell phone 406. A QR code is a type of barcode that encodes information in two dimensions. Return slip 402 may also include alternative methods of signing up, such as instructions for accessing a sign-up page of cryptocosm 10 through ACME Power Company's website.

After scanning QR code 404, the user is directed to a sign-up page 420 of cryptocosm 10 as shown in FIG. 4b. Sign-up page 420 can be a website accessed through a web browser or a screen in an app made for accessing and using cryptocosm 10. In embodiments where an app is used, QR code 404 can automatically send the user to the app store page to install the cryptocosm 10 app if needed. QR code 404 can be custom generated on each customer's bill so that scanning the QR code results in most of the sign-up fields being automatically populated based on information known to ACME Power Company. The data can be directly embedded within QR code 404, or the QR code can include an identifier that tells the QR code which customer's information to load from data previously acquired from ACME Power Company.

FIG. 4b shows an example sign-up page 420. A personal information section 422 shows the customer's name and address as acquired from QR code 404, directly or indirectly. A map 424 optionally shows the user's address visually for easier confirmation of correct information. Other personal information, such as phone number, email address, or birthday can be automatically populated if previously provided by ACME Power Company or if embedded within QR code 404. Empty fields can be shown to request the user to fill in any missing information. While QR codes are specifically discussed, any type of two-dimensional bar code or other visual representation of information can be used in other embodiments.

Linked accounts section 430 is shown below personal information section 422. The user's account with ACME Power Company is automatically linked by initiating the sign-up process through the ACME Power Company's system. As part of the sign-up process, the user can link other accounts to the z-pop 42 being created by clicking add account button 432. Pressing add account button 432 pops up an overlay or opens another screen allowing the user to add accounts that the user has with other businesses that have z-bpops 44 on cryptocosm 10. The user may have information from other businesses or essential service providers that can be entered into the add accounts screen to link the user's accounts to the z-pop 42 being created. Alternatively, the add account screen can offer search functionality that allows the user to search through businesses and essential service providers that are already on cryptocosm 10 and that the user may already have an account with. In one embodiment, cryptocosm 10 already has linked the user's z-prop 32 with all available essential service providers, and the sign-up page can specifically prompt for addition of accounts with essential service providers known to operate at the user's address.

The user can link a payment account to the z-pop 42 being created by clicking link payment account button 436 in linked accounts section 438. Added accounts will be listed and editable in linked accounts section 438. The user will need some form of payment account linked to the z-pop 42 in order to pay bill 400 from ACME Power Company. Cryptocosm 10 can link with several different types of payment accounts. Routing and account numbers can be entered to link a traditional checking or savings account. Login credentials to an online payment processor, such as PayPal or Cash App, can be entered to link those accounts as payments accounts within cryptocosm 10. In one embodiment, the entity creating cryptocosm 10 negotiates with an online payment processor to automatically generate or link a payment processor account with each z-pop 42, and the online payment processor handles the payment account logistics. In other embodiments, each z-pop 42 includes a cryptocurrency wallet and every transaction on cryptocosm 10 is transacted using the cryptocosm's cryptocurrency. When all transactions are performed in the cryptocosm 10 cryptocurrency, separate payment accounts are only used for adding funds to the user's cryptocurrency wallet if needed.

Notably, sign-up page 420 does not include a password field. In one embodiment, cryptocosm 10 is completely devoid of the use of traditional passwords for any purpose. User identity is verified by biometrics, by a technical fingerprint of the device used to create the account, by a cryptographic key generated at sign-up accessible only by the user, or by any other suitable means. The biometric might include a fingerprint, facial recognition, or iris recognition that is input via an appropriate scanner that is attached to the device being used for sign-up. Alternatively, a password could be used and entered on sign-up page 420.

Whatever credential used is incorporated as part of a key in an encryption scheme to encrypt the user's personal data stored on cryptocosm 10 in one embodiment. In other embodiments, cryptocosm 10 stores a separate cryptographic key independent of the entered password or biometric, and the user's credential is simply used as part of an authentication scheme for the cryptocosm to give access to the user's decryption key.

While specific fields are shown in specific locations on sign-up page 420, any additional fields desired can be added, and the field and sections can be organized in any suitable layout. When all necessary information has been entered, the user clicks or touches save button 440. In most cases, all necessarily information will be filled in by default, and the user can complete signup with only a single click, that being save button 440. Cryptocosm 10 generates a z-pop 42 for the user and adds the z-pop to blockchain 450 as shown in FIG. 4c. Creating a z-pop 42 establishes a unique digital identity on blockchain 450. Blockchain 450 is a blockchain specific for z-pops 42 and other occupant layer 40 entities separate from blockchain 300 for z-props 32. Having separate blockchains for occupant layer 40 and property layer 30 helps compartmentalize information logically. In other embodiments, the occupant profiles of occupant layer 40 and the property profiles of property layer 30 are stored in a single blockchain. In one embodiment, all the cryptocosm 10 layers are stored in a single blockchain.

In FIG. 4c, blockchain 450 begins with z-pop 42a. Z-pop 42b is linked to z-pop 42a, and then z-pop 42c is being constructed to link with z-pop 42b. Each z-pop 42 includes a unique z-pop index 452. Z-pop index 452 can be randomly generated or applied sequentially to each z-pop 42, as with z-prop index 302 and z-base index 304. Z-pop index 452 operates similarly to z-prop index 302 and z-base index 304, allowing the particular z-pop 42 to be quickly looked up in blockchain 450. Z-pop index 452 can be stored in other z-pops 42, z-bpops 44, z-props 32 or other data structures to create a link to the particular member of occupant layer 40.

Each z-pop 42 also includes any personal information of the respective occupant that is entered into cryptocosm 10. In the example of z-pop 42c, name 454 and address 456 from sign-up page 420 are stored. Other personal information can be stored if requested on sign-up page 420 or otherwise acquired.

A Z-prop index 302 is stored in z-pop 42c. Z-prop index 302 is a pointer that identifies a z-prop 32 within blockchain 300. Z-prop index 302 can be retrieved from blockchain 300 after doing a search of the blockchain based on the provided address of the user. Z-prop index 302 identifies the property that the individual user lives at, and identifies the property that a business operates out of for z-bpops 44. Z-pop 42c can also include a variable or data that indicates the type of relationship of the z-prop 32 linked to by z-prop index 302, i.e., that the z-prop is the user's home. Multiple z-prop indexes 302 can be stored with each z-pop 42, with the other z-prop indexes representing the user's work office, properties where the user is a landlord, or for any other relationship that the user has to a property.

Z-pop 42c includes a z-bpop index 458 of ACME Power Company to connect the user to the power company as a customer. The "type of relationship" variable for the z-pop index can indicate that the user is a customer of the linked z-pop. The user's account number and other information specific to the user's relationship to the linked z-pop can also be stored. A z-bpop index 458 can stored for any number of linked accounts that the user enters in linked accounts section 430 of sign-up page 420, or that cryptocosm 10 knows about based on other data aggregation methods.

Additional data that cryptocosm 10 has access to related to the user can be added at the time that z-pop 42c is created at sign-up. In FIG. 4c, attributes 460, 462, and 464 are gathered from website 470, website 472, and database 474 and stored as part of z-pop 42c. Websites 470 and 472 can be any websites that contain information relevant to the user. In one embodiment, website 470 is a website of a social media platform that the user has an account with, and website 472 is the website of ACME Power Company that ACME has agreed to give cryptocosm 10 access to so that the cryptocosm can import information about ACME's customers into the cryptocosm. Cryptocosm 10 can crawl website 470 and find any information about the user for storage as part of z-pop 42c, e.g., attribute 460. Website 472 may have an API that the computer generating z-pop 42c can access to pull available information about the user, including attribute 462. Database 474 can be any information from a database that the cryptocosm 10 developers have access to. Database 474 may be purchased data from a government entity or private data broker containing any arbitrary data relating to individuals, including attribute 464.

Once all initial data is gathered for storage as z-pop 42c, the z-pop is added onto blockchain 450 after z-pop 42b. As with blockchain 300, z-pops 42 can be grouped together in a block before adding to blockchain 450 to make more efficient use of the blockchain. Additional data that is stored for general use of blockchains, such as cryptographic hashes, is not illustrated.

The cryptocosm 10 systems continue creating and adding z-pops 42 as individuals sign up for the cryptocosm. In one embodiment, all types of profiles are stored in a single blockchain 450. FIG. 4c shows a business profile stored as z-bpop 44a on blockchain 450 after z-pop 42c. Any type of cryptocosm 10 occupant profile can be stored and intermixed within blockchain 450. Additional types of occupant profiles will be discussed below.

As with blockchain 300, data stored on blockchain 450 is practically immutable. If any attributes stored for a z-pop 42 need to be changed, the original values are not overwritten. Rather, a new block is added to blockchain 450 with an updated value to the same attribute. The new block will have the same z-pop index 452 to indicate that the information in the block pertains to the same individual or z-pop profile. Any future accesses to the blockchain data will understand that the newer information supersedes the older information, and will be able to observe how the data changed over time.

Data can be changed by storing a single value that overwrites a previous value, by storing a new value in a field that previously had no value for the profile in question, by storing a directive that a field be deleted due to no longer applying, by storing an entire z-pop 42 profile with every field duplicated whether changed or not, or by any other suitable method.

Figure 5:
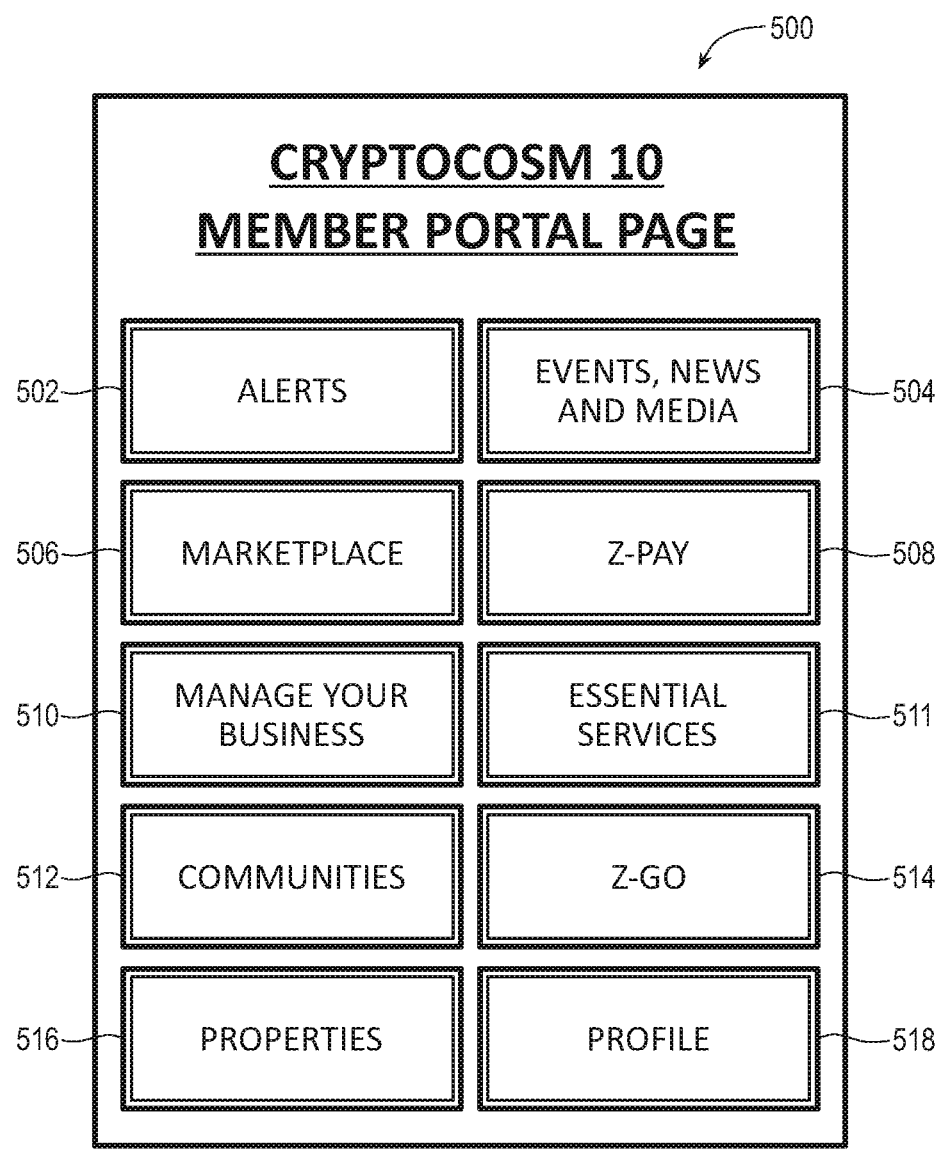
FIG. 5 illustrates a member portal page for interacting with the cryptocosm need finder layer.

Once a user has a z-pop 42 created, the user can interact with cryptocosm 10 using a custom portal page. FIG. 5 shows an exemplary profile portal page 500 for an individual user. Portal page 500 is a portal to all of the user's local needs, in real time 24/7, 365. Portal page 500 is, in a way, a graphical representation of, and portal to use, view, and edit, the data stored in a z-pop 42 profile, thus "pop" stands for profile page while being a different physical entity from the profile page being viewed on a phone screen. Portal page 500 is presented as a sample phone screen that a user might see when interacting with an app created to access cryptocosm 10. Similar options could be presented on an app or web page interface on a mobile device, desktop computer, or any other type of computer system. Portal page 500 includes options for alerts 502, events, news, and media 504, marketplace 506, z-pay 508, manage your business 510, essential services 511, communities 512, z-go 514, properties 516, and profile 518. A user can tap or click any of the illustrated buttons on their phone or other device to move to other screens providing the indicated functionality.

Most of the functionality available on portal page 500 allows a user to interact with need finder layer 50. Need finder layer 50 is the layer of cryptocosm 10 responsible for identifying and satisfying a user's needs. A need can be any type of good or service that the user may need, desire, or want to purchase or consume. Needs can be determined by cryptocosm 10 by allowing the user to expressly define a need, or cryptocosm 10 can automatically determine needs based on tracking the user's behaviors and habits. A user's needs define only one side of need finder layer 50, i.e., the demand side of the supply-demand equation. The need finder layer 50 also includes functionality to allow users to enter demand side information, i.e., sell products or services on cryptocosm 10, or otherwise distribute consumables.

The primary location for a typical end user interacting with need finder layer 50 is through the marketplace functionality of cryptocosm 10. However, other sections can be considered logically within need finder layer 50. For instance, events, news, and media button 504 allows a user to find, purchase, and view content from news and media organizations. The media content is supplied by media companies and other creators that have z-bpops 44 or z-pops 42 and have posted their content as a supply profile within need finder layer 50. Z-go button 514 provides the ability to have goods and services delivered or to acquire local ride-sharing transportation for the user to fulfill a need. Different buttons on portal page 500 allow user interaction with different areas of need finder layer 50, or allow the user to otherwise interact with cryptocosm 10.

Tapping alerts 502 shows the user any alerts or notifications that may need the user's attention or be useful for the user. The alerts 502 button may have a badge or other overlay on portal page 500 indicating that alerts are available to view. The alerts can relate to any of the functionality of cryptocosm 10. Example alerts will be discussed below with regard to the various other functionalities being described.

Tapping events, news, and media 504 opens up another screen that shows information relating to news, current events, and media that can be consumed. The information can be presented in any suitable news feed, blog, or website format. The information can be news or announcements related to cryptocosm 10. For instance, the next screen after tapping button 504 could present announcements of new businesses, services, or products available on cryptocosm 10 and related to products or services the user has previously purchased. The information can be local or national news stories selected from a variety of online news sources. Media viewable by the user can be live television channels or sporting events, prerecorded media such as movies or television series, or amateur online media that other users have created.

Any suitable information related to current events, news, or media can be presented in any suitable format on a separate screen after the user taps or clicks events, news, and media 504. The presented information can be selected based on express interest from the user, such as subscribing to a news feed or a peer's blog, or based on implied interested determined by cryptocosm 10 by analyzing the user's historical activity. Need finder layer 50 is responsible for fulfilling the user's implicit and explicit media needs within the events, news, and media section. In some cases, the events, news, and media section may generate an alert on the alerts section. For instance, alerts button 502 may show a notification of a breaking local news story or that a new episode of a user's favorite TV show is available.

Clicking marketplace button 506 takes a user to a marketplace section with additional pages that allow the user to shop private marketplaces, retail storefronts, job listings, and other types of product and service marketplaces. Need finder layer 50 is responsible for determining the best product or service on the supply side to fill the user's need on the demand side. Goods and services can be filtered by type, ratings, proximity to the user, and other factors to identify the best possible product or service providers to fulfill the user's need.

Figure 6A:
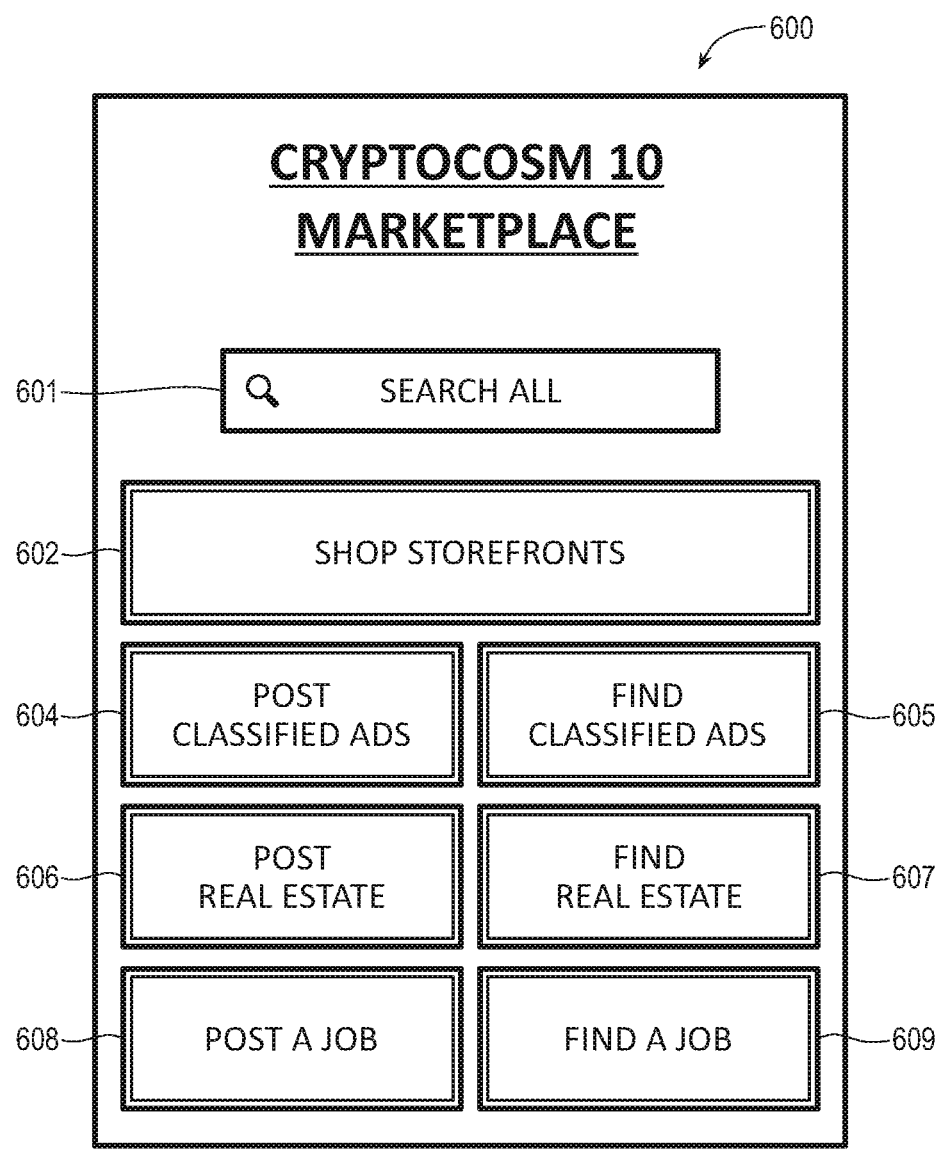
FIGS. 6a-6f illustrate marketplace functionality for individual members of the cryptocosm.

FIGS. 6a-6f illustrate marketplace functionality of cryptocosm 10. FIG. 6a shows an exemplary marketplace page 600. The display of marketplace page 600 includes search bar 601, shop storefronts button 602, post classified ads button 604, find classified ads 605, post real estate button 606, find real estate button 607, post a job 608, and find a job button 609. Search bar 601 allows searching of all marketplace categories by users. In addition, each of the demand-side sub-pages opened when buttons 602, 605, 607, or 609 are pressed include search bars that will search just the respective category.

Pressing shop storefronts button 602 takes the user to a storefront page or dashboard that allows the user to browse and search local storefronts. Each storefront within cryptocosm 10 represents a separate business entity, retail store, or chain of stores. A storefront is set up as a z-front 56 by a business entity having an associated z-bpop 44 within blockchain 450. Storefronts are data structures within need finder layer 50 that each expresses one or more supply-side goods or services that the business can supply to satisfy the demand-side need of a user. The user can browse storefronts by narrowing down on geographic location and keywords, attributes, or types of goods and services until a manageable number of storefronts to browse are presented, e.g., 2-10 storefronts. Alternatively, the shop storefronts section includes a search function that will show results organized by geographic proximity to the user. A user can also directly access the storefront of a specific retailer by searching or by clicking a link to the storefront.

Figure 6B:
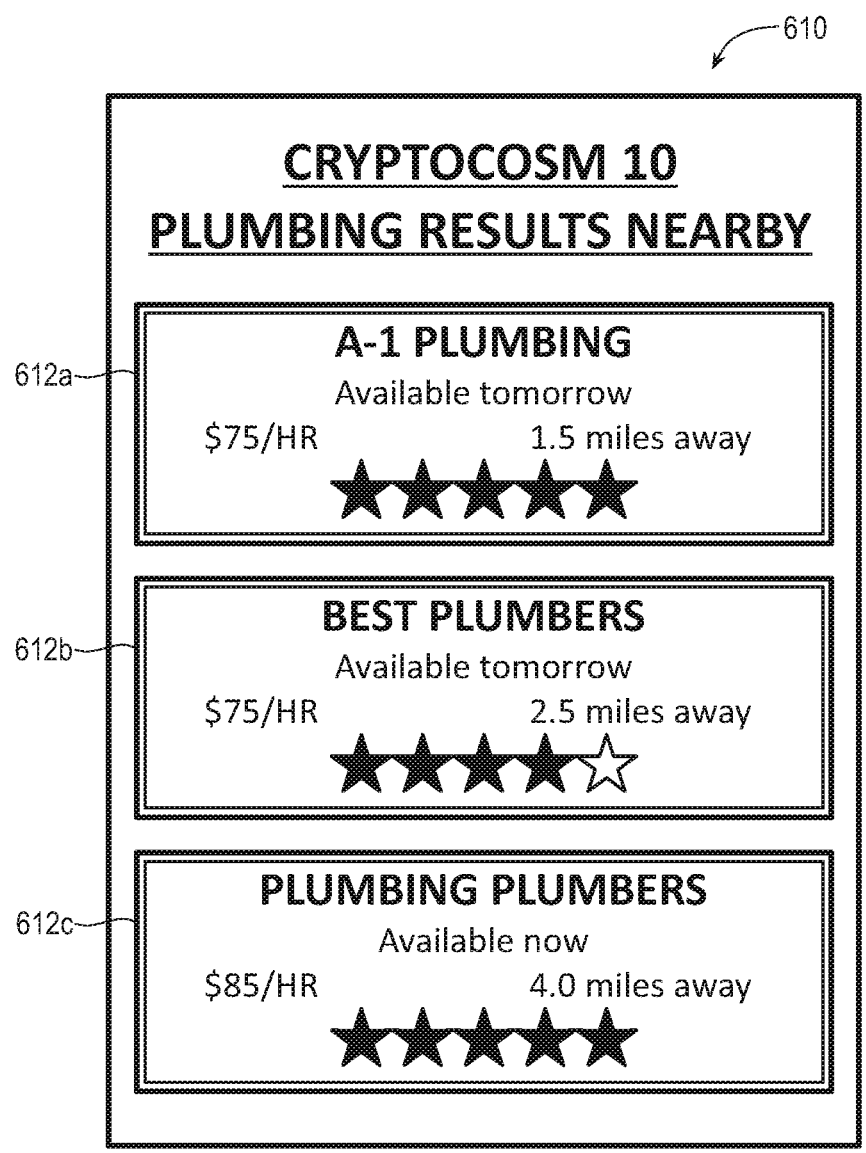

FIG. 6b shows an example storefront search results page 610 after a user searched for storefronts capable of supplying plumbing services within the storefront marketplace. Results page 610 lists results in order of closest geographic proximity to the user. In some embodiments, a user is able to sort by any desired criteria, e.g., best rating, soonest availability, or any other attribute. However, in other embodiments cryptocosm 10 is designed to only show results in closest proximity order to ensure fairness in results and promote purchasing local goods and services.

Results page 610 shows 3 results 612a, 612b, and 612c, because three results fit on the page with all the other accompanying information. However, more results may be shown in other embodiments, or the user may scroll down to view additional results. Each result shows a name of the business, next availability for an appointment, distance away from the user, price, and a general rating for the storefront. The rating is an aggregation of review that users have left for the storefront after making a purchase. Other pertinent information for each resultant storefront can be displayed for other searches, e.g., a general price range for restaurants or the price of a specific good being searched for. Attributes to show in search result listings can be determined automatically by cryptocosm 10 or configured by the user.

Figure 6C:
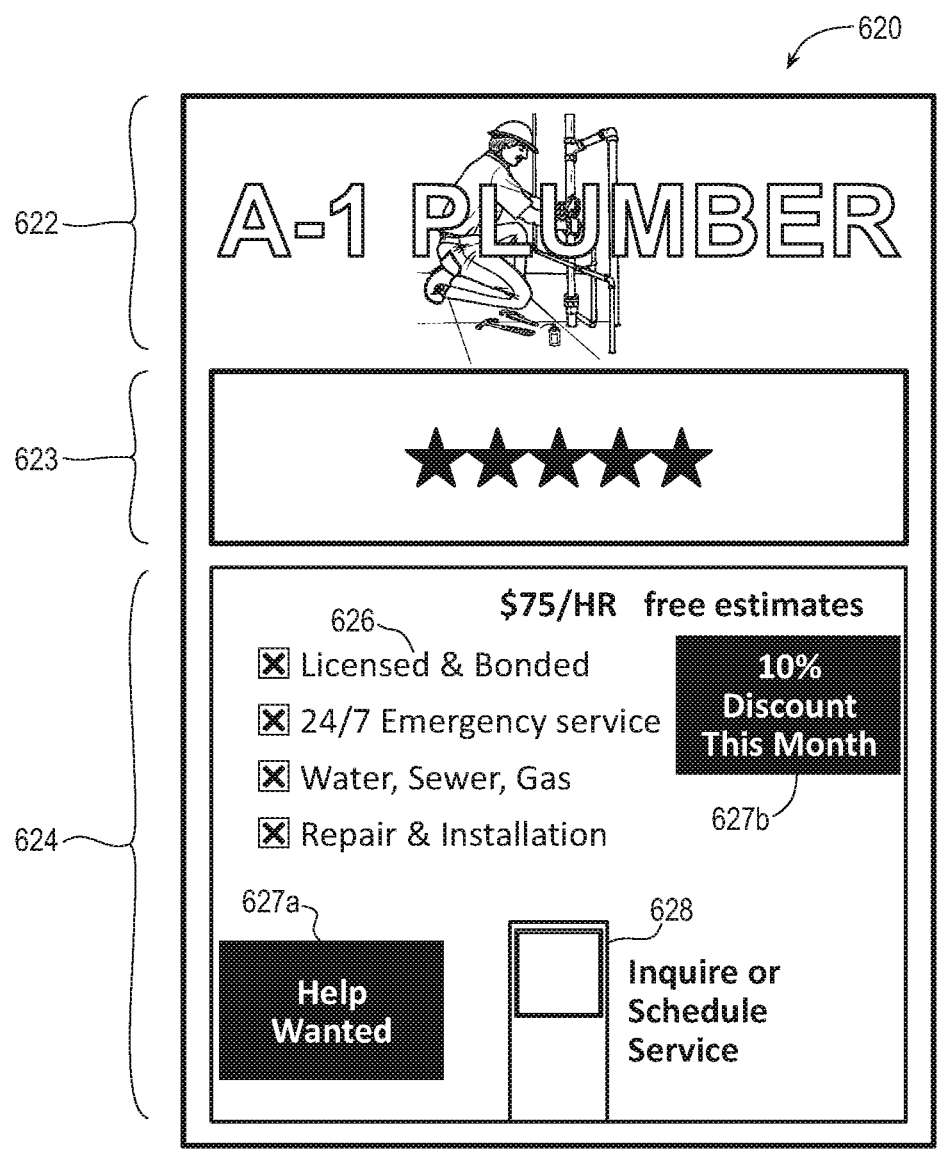

The user can tap on any of the results 612a-612c to open up the respective storefront page. FIG. 6c shows a storefront page 620 for A-1 Plumber, reached by tapping result 612a from results page 610. Results page 620 includes a header 622 with the storefront's name, logo, header image, and any other graphical elements the storefront manager desires to include in the storefront's header configuration. Reviews section 623 includes the overall user rating of the storefront and may also show a preview of individual user reviews or other summary of ratings. Clicking review section 623 opens up a separate review page for the storefront that allows the user to browse all reviews that other users have left. Real time reviews help shoppers select products, services, and providers, and help businesses improve services.

Storefront body 624 is configurable by the storefront manager and includes details of products or services provided through the storefront. Storefront body 624 can include any details believed by the manager to best market themselves to the users of cryptocosm 10. A bulleted list of marketing points 626, or any other marketing material, can be added to body 624. Badges and other overlays can be used to highlight certain current offers, e.g., badge 627a advertising that the business is hiring and badge 627b advertising a current sale. For service industries, example prices for different services or a general hourly rate may be all that is included within body 624 as far as pricing. A button 628 is provided for scheduling an appointing or service call. The z-pops 42 connected to the business's z-bpop 44 as managers, another similar function, or have delegated responsibilities, receive notifications of inquiries through alerts button 502 on their portal pages 500 in real time 24/7. For goods-based storefronts, specific items for sale may be shown with exact prices to purchase the goods and buttons are provided to visit product-specific pages or to directly purchase the products.

Figure 6D:
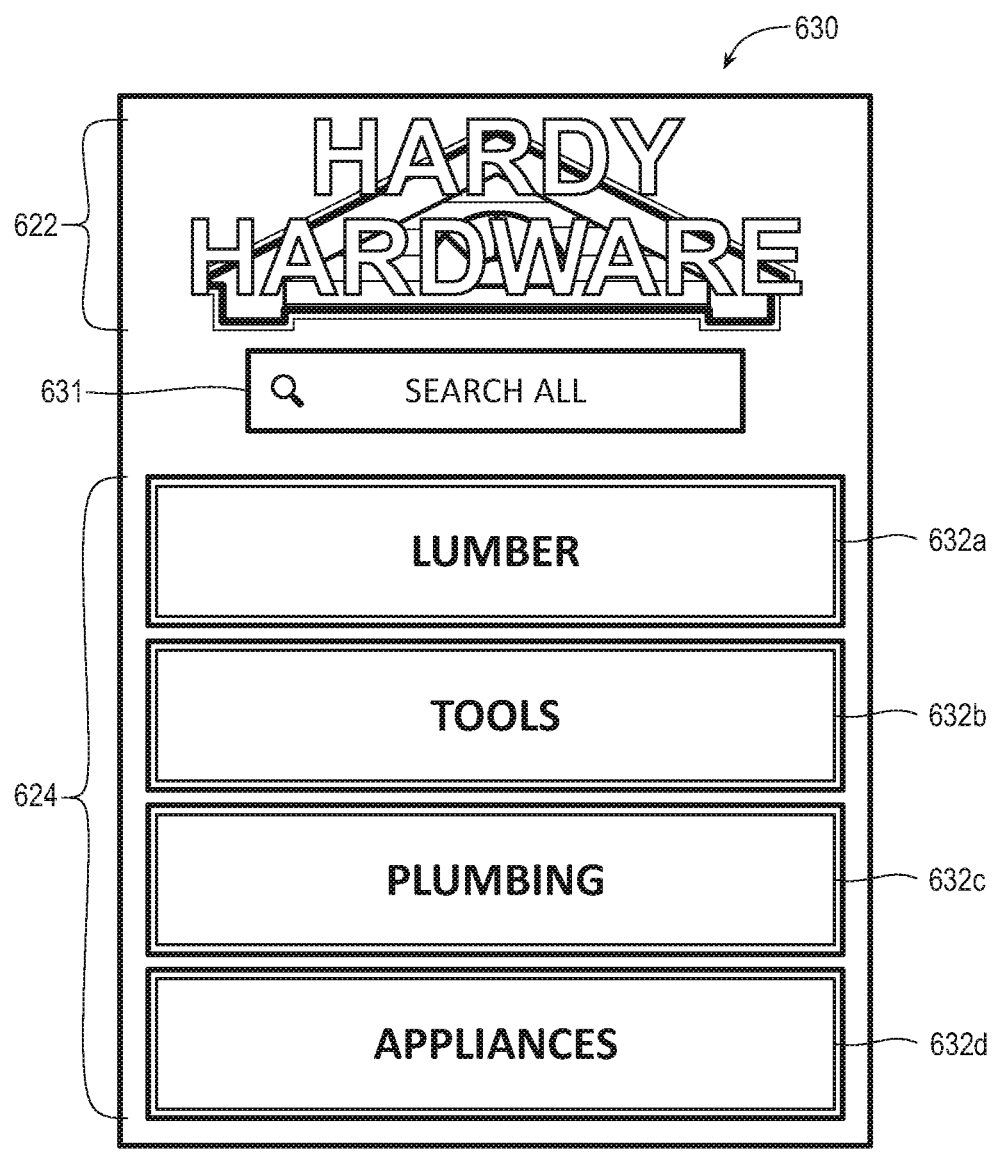

FIG. 6d shows a storefront page 630 for an example goods-based business. Storefront page 630 includes a search bar 631 to search for goods specifically within the current storefront. The manager of the storefront has organized body 624 into a plurality of sections to allow the user to browse offered goods by category of good. Buttons 632a-632d take the user to separate pages to browse or search goods specifically within the identified categories. Storefront page 630 may include a reviews section 623 for reviews of the business storefront as a whole, or reviews may be shown only for individual products to save space on the main page.

Returning to FIG. 6a, buttons 604 and 605 provide access to the classified ad functionality of the cryptocosm 10 marketplace. The classified functionality allows the user to buy or sell products and services to and from other users. Individual users can buy or sell from each other similar to local classified ads. A user clicks button 604 to post a classified ad to offer a good or service for sale, or clicks button 605 to search and browse classified ads posted by others. Posting a classified ad generates a z-pro-s 52 supply profile for the item being sold. Searching or browsing classified ads creates a z-pro-d 54 demand profile to match against the copious supply profiles already created.

Figure 6E:
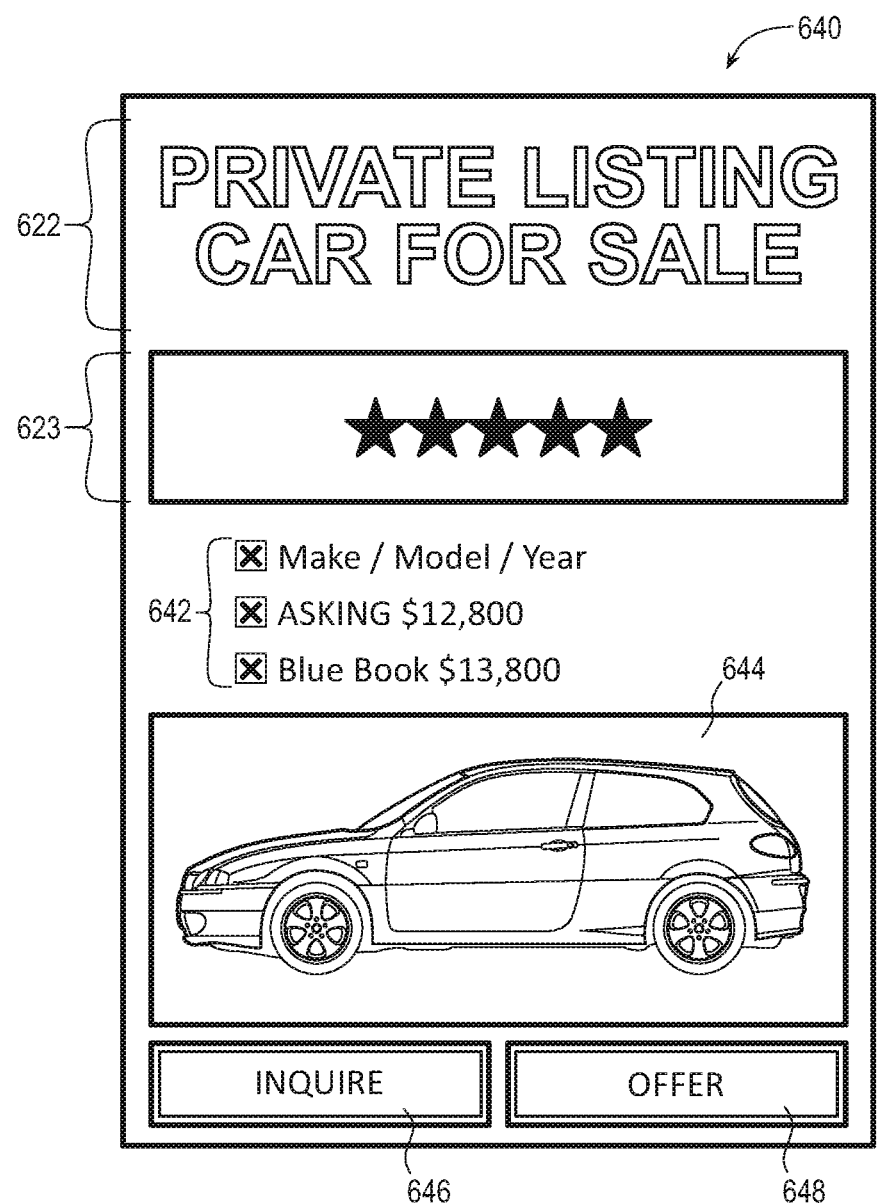

FIG. 6e shows a classified listing page 640. Page 640 includes a header 622 and reviews section 623 similar to the storefront pages. Reviews section 623 shows reviews for the user as a seller. In other embodiments, review section 623 shows reviews for the product being sold in addition to seller reviews. Attributes section 642 of page 640 shows a list of attributes for the good or service being sold. In the vehicle example of FIG. 6e, attribute would most commonly be make, model, and year of the car, service history, asking price, mileage, etc. More fine-grained details, such as air conditioning, air bags, leather seats, etc. can be added by the seller or automatically imported based on the make of the vehicle to allow better matching with buyers' demand profiles. One or more pictures 644 of the product are included to show the user the product for better evaluation. Inquiry button 646 provides a mechanism for the user to contact the seller to ask questions and offer button 648 provides a mechanism for the user to directly purchase or make an offer on the product.

For selling a product, a page similar to page 640 is used, but is presented as a form rather than a display-only page. The seller is able to enter any relevant attributes of the product, provide other information, and upload pictures to the page. Once the seller has input all desired information, a save button is clicked which generates a z-pro-s 52 supply profile data structure for the classified ad. A z-pro-s 52 is a supply-side product or service profile within need finder layer 50, as shown above in FIG. 1.

Need finder layer 50 matches a user's z-pro-d 54 demand-side profile to the optimal z-pro-s 52 to facilitate satisfaction of the user's demand. A demand-side z-pro-d 54 can be explicitly set up by a user in a similar manner to the supply profile, e.g., by entering desired attributes of a product. Alternatively, cryptocosm 10 can generate the z-pro-d 54 data structure in the background as a user performs typical search functions of the classified ad database. Z-pro-s 52 and z-pro-d 54 profiles are matched together based on having entered attributes in common and geographic proximity of the buying and selling z-pops 42.

Figure 6F:

Returning to FIG. 6a, buttons 606 and 607 provide access to real estate functionality of the cryptocosm 10 marketplace. Button 606 allows a user to post real estate for purchase or lease, and button 607 allows the user to search for real estate available to purchase or lease from other users. FIG. 6f illustrates an example real estate listing page 650 with header 622, reviews 623, and body 624. Body 624 shows a list of attributes 642 of the real estate listing. Badges 627c and 627d show various marketing messages. Inquiry button 652 allows a user to contact the seller or lessor to begin the sale or leasing process or just ask a question. Pictures of the real estate property for sale or lease may be included on the page as a header image or as part of body 624.

Similar to the classified ad pages, real estate matching is performed by need finder layer 50 through z-pro-s 52 and z-pro-d 54 data structures. A user that has a supply of real estate, e.g., a property to sell or rent, creates a z-pro-s 52 supply side profile by entering all relevant attributes into a form. Z-fronts 56 can be created by real estate companies to encompass a plurality of real estate supplies, e.g., multiple apartment complexes or multiple units within a complex. Z-fronts 56 from real estate may be referred to as a street-front.

Much of the information for real estate supply profiles is automatically available by simply importing all the information within the associated z-prop 32 that already exists for the property. A potential buyer or renter creates a z-pro-d 54 demand side profile by entering all desired attributes into a similar form. Need finder layer 50 matches the demand side profile against all available supply side profiles to find the best local result to fulfill the user's real estate need. Matches are shown as a list of results in geographic proximity order similar to page 610 in FIG. 6b.

Returning to FIG. 6a, buttons 608 and 609 provide access to the job marketplace functionality of cryptocosm 10. Button 608 allows a user to post a job opening, while button 609 allows the user to search and apply for job openings. In some embodiments, button 608 to post job openings is only available if the user's z-pop 42 profile has a connection 46 to a z-bpop 44 that indicates that the user is authorized to manage the hiring process for a business. The job marketplace operates similarly to the previously described marketplace functionality. Users with a job "supply" set up z-pro-s 52 supply profiles and users with demand for a job set up z-pro-d 54 demand profiles. Need finder layer 50 matches demand and supply profiles based on common or compatible attributes to return job supply results that best fulfill the job demands.

Returning to FIG. 5, pressing z-pay button 508 gives the user access to pages related to transaction layer 60. Z-pay is the transaction and payment functionality of cryptocosm 10. The z-pay pages accessed through z-pay button 508 include the ability to manage payment methods, pay for goods and services, review transaction history, schedule payments, transfer funds to another z-pop 42 account, etc.

Figure 7A:
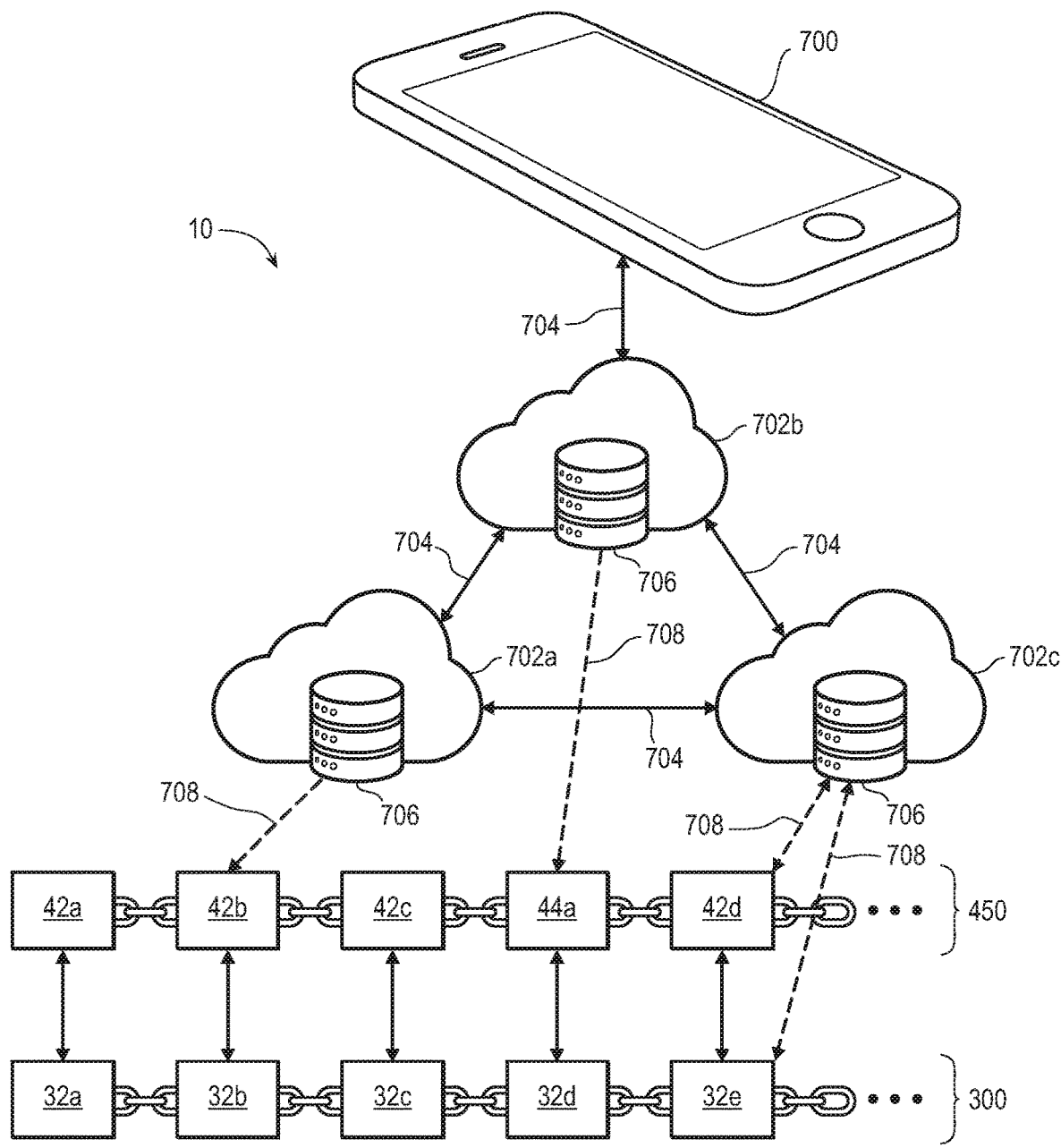
FIGS. 7a-7d illustrate the need finder and transaction layers of the cryptocosm.

FIGS. 7a-7d illustrate transaction layer 60, the relationship between the transaction layer and need finder layer 50, and how the transaction layer and need finder layer operate. FIG. 7a shows an operational overview of cryptocosm 10. A user accesses cryptocosm 10 from a cell phone 700 or other computer system. Cell phone 700 can be the same or a different computer system than the device used to sign-up for cryptocosm 10 above. Cell phone 700 displays portal page 500 for a user to access cryptocosm 10 by loading web page data in a web browser or through an app that pulls data from a cloud system 702 over the internet 704 or a similar data network. Cloud system 702 comprises a plurality of computers connected to each other through internet 704.

Each of the cloud servers 702a, 702b, and 702c represents a computer server running in a data center or other building located in any arbitrary location. Any number of computers at any combination of locations can be used in various embodiments. Cloud servers 702a-702c include storage 706 to hold all the data that is used or generated by cryptocosm 10. Content for cryptocosm 10 is stored as files on any suitable file system in combination with relational databases to organize data and any other suitable types of data structure.

Data for running the cryptocosm 10 front end and back end, such as web page source code, web page resources, and need finder algorithms, is located in storage 706 on cloud system 702. As a user operates the cryptocosm 10, phone 700 is in continuous or periodic communication with cloud system 702 to download data to display for the user from the servers and upload data back to the servers to trigger action by the servers. Much of the data related to need finder layer 50 is stored in storage 706 rather than in blockchains such as blockchains 300 and 450. Storing data locally on servers 702a-702c allows quicker access to the large and random data set needed for the need finding functionality than blockchain would.

In particular, z-pro-s 52 supply profiles and z-pro-d 54 demand profiles are typically generated by a server 702a-702c when the user, interacting via phone 700, indicates a demand or supply of a good or service. The demand or supply profiles are stored in a database on storage 706. Demand and supply profiles will be generated constantly by users on cryptocosm 10, and could easily number in the hundreds of thousands or millions. Storing supply and demand profiles in a blockchain would be possible but add significant computational work for cloud system 702 while slowing down generation of and searching for profiles. There is also no need to store every single supply or demand profile that is ever generated permanently in a blockchain, whether a transaction ultimately results. Details of completed transactions are stored permanently in the blockchain as discussed below, while demand and supply profiles may be discarded eventually from the relational database to reclaim storage space.

Cloud system 702 has access to blockchains 300 and 450 to retrieve data needed for the user's interaction with cryptocosm 10. Cloud system 702 can perform blockchain reads 708 to grab the user's z-pop 42 to use the profile data for user authentication, need finding algorithms, and other cryptocosm 10 functions. Z-pops 42 of users can be cached in storage 706 for quicker access. Cloud system 702 can periodically check new blocks of blockchain 450 to determine if any updates to cached z-pops 42 have been added. Cloud system 702 can also perform blockchain reads 708 on blockchain 300 to acquire information regarding any z-props 32 connected to the current user's z-pop 42. Blockchains 300 and 450 exist as file systems distributed across any number of computers of cryptocosm 10 users that choose to participate in the distributed file system. Cloud system 702 can participate as part of the distributed blockchain file systems. Cloud system 702 can also store complete copies of all relevant blockchains on storage 706 as a backup or to have a local copy for quicker reads.

A user fulfilling a demand side need would generally proceed as follows. First, the user would open up an app for cryptocosm 10 on phone 700. The app would set up a connection to a server 702a-702c, usually the geographically closest or a randomly assigned server. The app provides a mechanism for the user to identify the z-pop 42 belonging to the user, which operates as a user account for the app. The z-pop 42 can be identified by entering a username and password that is coordinated with an associated z-pop index 452. Alternatively, a fingerprint reader or other biometric input on phone 700 can be used to identify the user and look up the user's z-pop 42. The app can include embedded authentication data stored on phone 700 that is sent to cloud system 702 to unlock and decrypt the user's z-pop 42 and other data. A password may or may not be required. In some embodiments, data extracted from the user's biometric data is all that is required to unlock and decrypt the user's data.

Once cloud system 702 identifies the user and retrieves any needed data from blockchain 450, blockchain 300, and storage 706, the server creates a customized version of portal page 500 and sends data to the app on phone 700 to render the portal page. Data for the pages shown in FIGS. 5 and 6a-6f is downloaded onto phone 700 in common web formats, such as JavaScript, CSS, and HTML. Data may also be sent in proprietary formats. The user clicks marketplace button 506 and then generates the z-pro-d 54 demand profile to define a need. A demand profile can be generated by performing a search with search bar 601 or any of the search bars within the marketplace subcategories. The search results can be narrowed down by adding attributes to the demand profile through further searches or by using attribute checkboxes displayed adjacent to the search results. Cryptocosm 10 creates and saves a z-pro-d 54 data structure in storage 706 as a record of the demand. Alternatively, a demand profile can be directly created and saved by a user by selecting attributes on a demand profile creation page.

With a z-pro-d 54 created, cloud system 702 cross references the demand profile against all available z-pro-s 52 supply profiles and storefront product profiles, which are stored in a database on storage 706, to create a list of results in geographic proximity order. Cross referencing between supply and demand profiles occurs by comparing attributes of the demand profile against attributes of supply profiles to determine the best matches. Various algorithms can be used to compare attributes of demand profiles against attributes of supply profiles to rank the available supply profiles in a results list for a given demand profile. The algorithm can be as simple as matching supply profiles for the highest number of equal attributes to the demand profile, and then listing the top results by geographic proximity.

More complicated algorithms might weight attributes based on how similar the value of an attribute is between the supply and demand profiles. For instance, a height attribute equal to six feet in a demand profile would indicate that the potential purchaser wants to has a demand to purchase something that is six feet tall. A supply profile that also has a height attribute of six feet would get weighted highest for matching the demand height exactly, while supply profiles with height attributes that were close but a little higher or lower would get lower weight for matching the height attribute. Each available attribute in the demand profile would get weighted for each available supply profile, and then the overall weights are averaged or otherwise combined to create a final ranking of supply profiles. Again, the top attribute matches can be displayed in geographic proximity order, or the geographic proximity can be weighted as an attribute. Any suitable algorithm can be used to compare attributes in supply profiles against attributes in demand profiles. In some embodiments, machine learning algorithms are used.

The data necessary to display results list 610 is retrieved by the appropriate server 702a-702c from storage 706, blockchain 300, and blockchain 450, packaged into the data structures necessary to render the results list, and sent to phone 700 for display.

The user can scroll the results list and review options before clicking one of the results to view additional details. The cryptocosm 10 app on phone 700 requests the detailed information page for the selected z-pro-s 52 supply profile and cloud system 702 sends the necessary information for the app to render the supply profile page on the phone. The page display will include a button for the user to press to complete a transaction 62 and purchase the displayed product or service, thus satisfying the z-pro-d 54 demand profile with a pre-existing z-pro-s 52 supply profile.

Figure 7B:
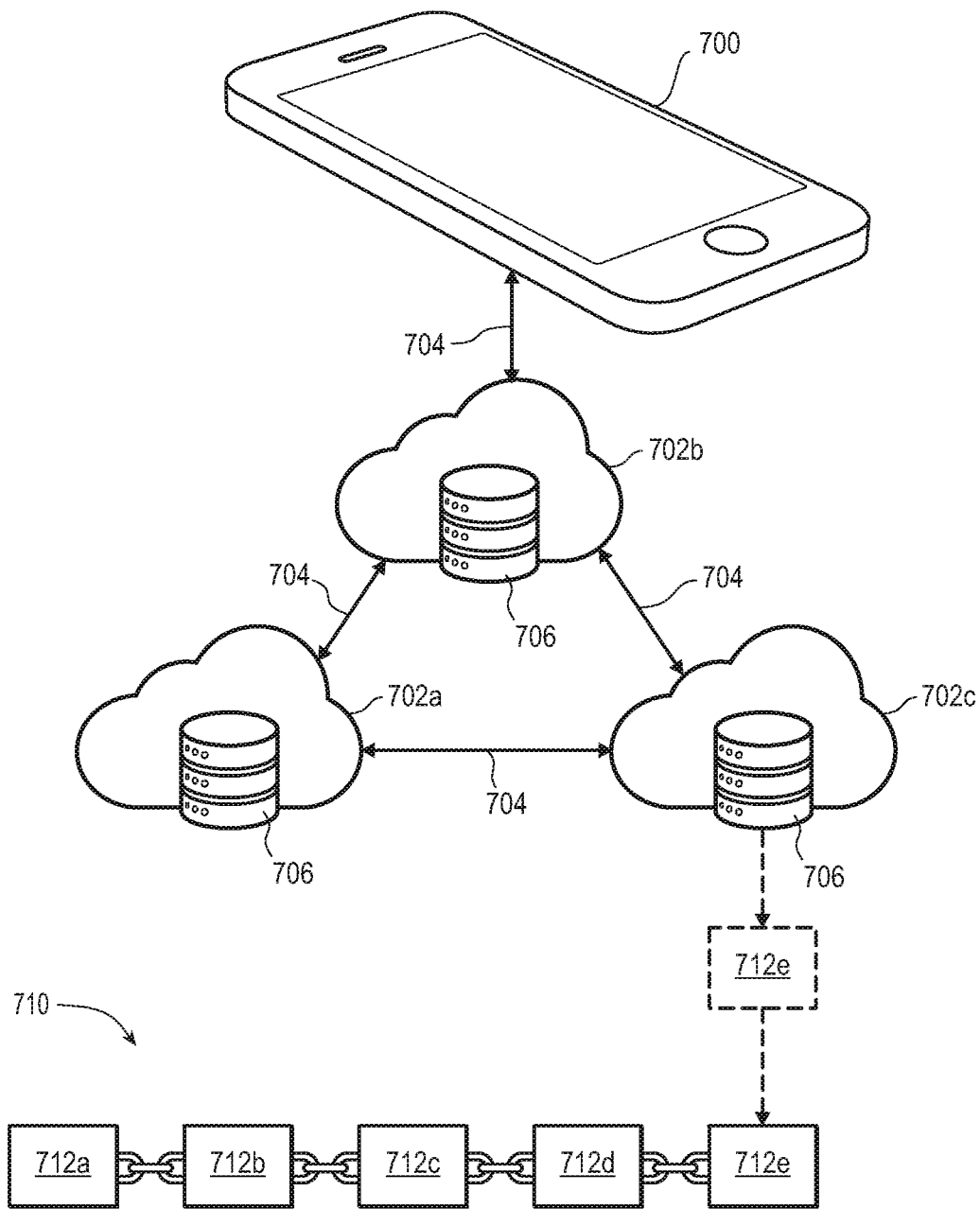

Purchasing logistics are handled by transaction layer 60. FIG. 7b illustrates a transaction blockchain 710 and cloud system 702 generating a transaction block 712 to add onto the end of the blockchain. Cloud system 702 creates block 712e that includes details of the most recent cryptocosm 10 transaction. Block 712e typically includes at least z-pop indexes 452 for the purchasing and selling entity, information identifying the product sold or service performed, and the amount of money exchanged for the product or service. Additional details of the transaction are recorded as well. Any records related to the product or service can be stored in blockchain 710, such as outcomes of services performed or attributes of the product purchased. Some payment details may be stored as well, such as an identification of the payment method or processing company used.

Transaction records are stored in blockchain 710 as a secure permanent record of all transactions on cryptocosm 10. Transaction records in block 712e can be encrypted in a way that only the seller and buyer are able to access the data. Multiple transactions may be recorded in a single block 712e to optimize blockchain resources while being separately encrypted from each other for security purposes.

Figure 7C:
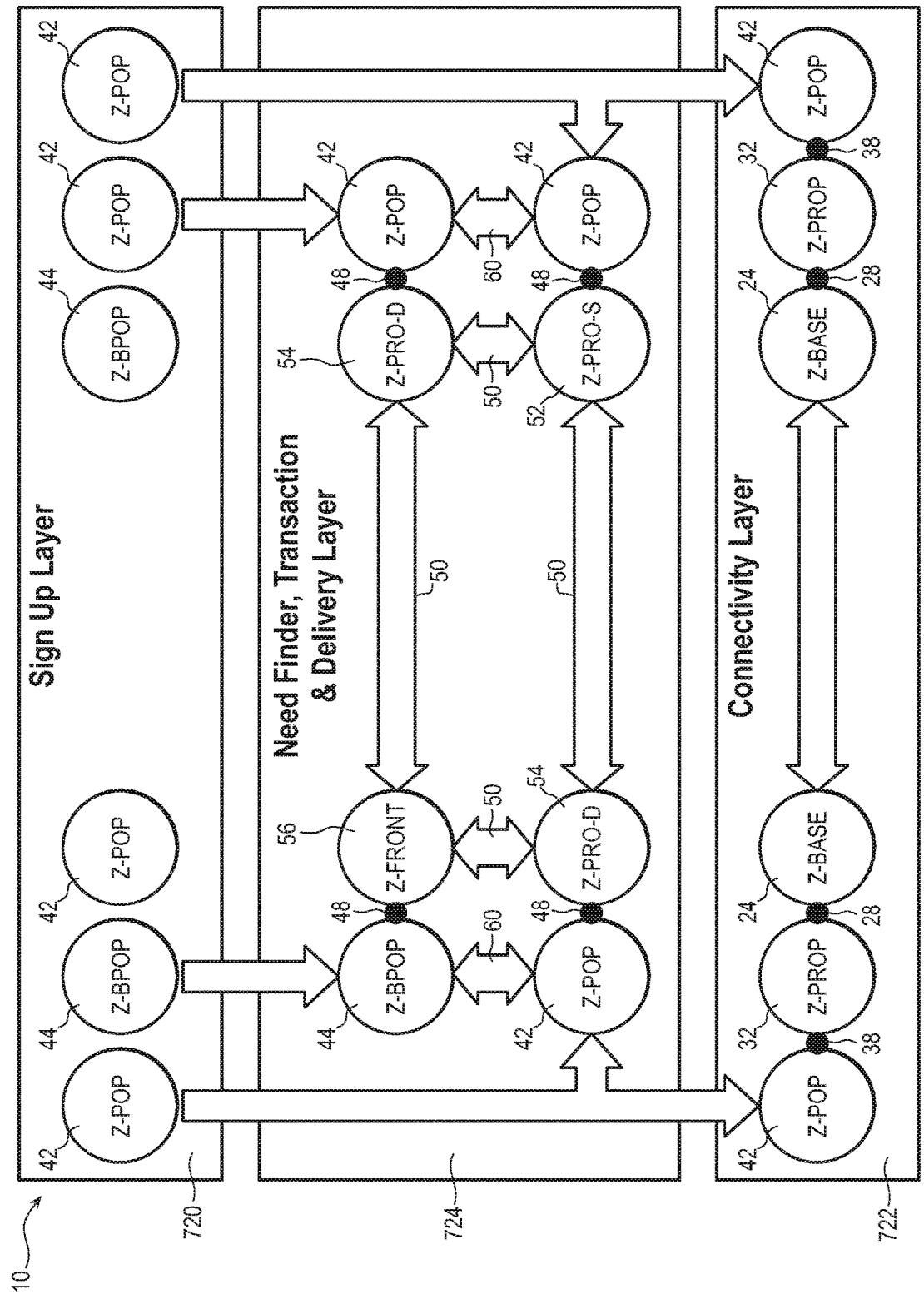

FIG. 7c shows a logical view of cryptocosm 10 with the layers in a slightly different organizational structure compared to FIG. 1. Sign-up layer 720, connectivity layer 722, and need finder, transaction, and delivery layer 724 are logical layers within cryptocosm 10, whereas parcel layer 20, property layer 30, occupant layer 40, need finder layer 50, and transaction layer 60 are structural layers. Z-pops 42, z-bpops 44, and other types of occupant layer entities are created in sign-up layer 720 as individuals and businesses sign up for cryptocosm 10.

Connectivity layer 722 connects the property and parcel layers to each other and to the z-pops 42 to organize members geographically after sign-up. Connectivity layer 722 also includes connections 48 that associate demand and supply profiles to occupant layer entities, although those are illustrated elsewhere in FIG. 7c. Connectivity layer 722 is a logical layer that describes any feature of cryptocosm 10 that is used to associate elements of the cryptocosm 10 with each other.

Need finder, transaction, and delivery layer 724 is responsible for allowing cryptocosm 10 to operate as a thriving marketplace once the structural elements of parcel layer 20, property layer 30, and occupant layer 40 are in place. Need finder layer 50 operates between z-pro-s 52 supply profiles, z-pro-d 54 demand profiles, and z-front 56 storefronts to match demands to supplies. Transaction layer 60 operates between entities in occupant layer 40 to transfer funds and facilitate delivery or pickup of products and scheduling of services.

Figure 7D:
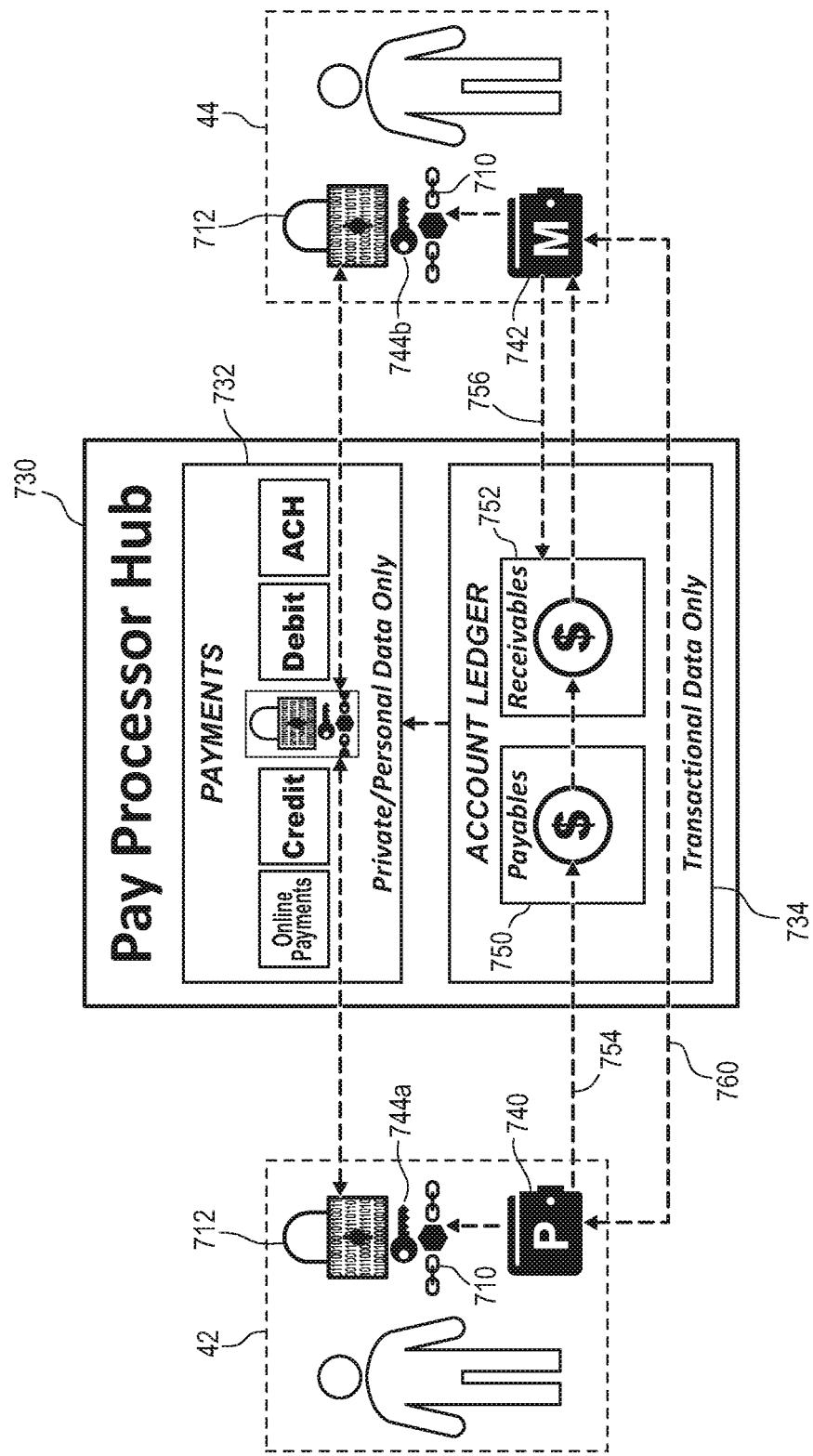

FIG. 7d illustrates additional logistical details of transaction layer 60 as a block diagram. Activity that occurs within transaction layer 60 is coordinated by a pay processor hub 730, which is a software block running on cloud system 702. Pay processor hub 730 includes two sub-blocks for performing different tasks related to transactions. Payments block 732 coordinates financial details and effects transfer of funds between occupant layer entities. Account ledger block 734 coordinates accounting and recording of transactions. Splitting transaction processing into two separate software blocks increases security of users' private information by isolating payment and personal data in payments block 732, while more general transactional data is handled by account ledger block 734. Payments block 732 and ledger block 734 are each software blocks executing on cloud system 720 and configured to execute their respective functions. The software blocks include APIs, private function calls, and other means for the other software blocks of cryptocosm 10 to transact through pay processor hub 730.

In FIG. 7d, an individual z-pop 42 is making a product purchase from a business z-bpop 44. Each occupant layer entity, including z-pops 42 and z-bpops 44, includes a digital wallet for tracking financial transactions. Z-pop 42 has a personal wallet 740, while z-bpop 44 has a merchant wallet 742. Digital wallets 740 and 742 are responsible for guiding financial transactions on behalf of the users. Wallets 740 and 742 interact with each other and account ledger block 734 to complete a transaction, and then store the details of the transaction in a block 712 of blockchain 710.

Each occupant layer 40 entity has its own cryptographic key 744 to secure data stored on blockchain 710. In FIG. 7d, z-pop 42 has key 744a to encrypt personal data stored on blockchain 710, and z-bpop 44 has key 744b. Each separate z-pop 42, z-bpop 44, and other occupant layer entity has a unique cryptographic key. The keys are used to scramble data in block 712 into a format unreadable by anyone who does not have the same key 744. Only the same occupant layer entity that stored the data on blockchain 710 is able to decrypt the data using the same key and access transaction details. In some embodiments, data on blockchain 710 is encrypted using keys 744 from both parties to a transaction so that either party can decrypt the transaction details unilaterally. In other embodiments, two copies of each transaction are stored, one encrypted with each party's key 744.

A transaction begins with either z-pop 42 submitting a payment 754 to payables block 750 via wallet 740, or z-bpop 44 submitting an invoice 756 to receivables block 752. A typical checkout process for a product purchase may involve both a payment being submitted to payables block 750 by the purchaser and an invoice being submitted to receivables block 752 by the seller. Account ledger block 734 matches the payment to the invoice and instructs payments block 732 to process a transfer of funds for the indicated amount from the buyer to the seller.

Payments block 732 is capable of processing any payment method, including online payment accounts, credit cards, debit cards, and ACH transfers. Account details for the buyer and the seller are securely transferred from the respective z-pop 42 or z-bpop 44 data structure to payments block 732. In one embodiment, the payment account details are pulled from blockchain 450, decrypted using key 744a or another cryptographic key, and then transferred to payments block 732. The payment account details can be encrypted by the parties to the transaction using public-key cryptography for transfer to payments block 732 and then decrypted by the payments block.

Payments block 732 uses the received account details to remove funds from the buyer and give the funds to the seller. Payment processing through pay processor hub 730 means that neither the buyer nor the seller have to receive and be responsible for financial information of the other party. Financial account information is only ever handled by pay processor hub 730, which is part of cryptocosm 10 and secure. Wallets 740 and 742 record that the transaction was completed by storing a record on transaction blockchain 710. Payments block 732 records that the payment was completed successfully onto blockchain 710.

In addition to payments 754 and invoices 756, wallets 740 and 742 also exchange non-payment transactional data 760 either directly or through account ledger block 734. Transactional data 760 includes information about the goods or services provided. Information can be imported automatically based on the data and attributes from the z-pro-s 52 supply profile for the product or service. Information can also be manually entered by either party to indicate outcomes of services or recommendations for future services, or to add information about a product purchased. Non-payment transactional data 760 is bundled with payment data by wallets 740 and 742 and stored on blockchain 710 to finalize the transaction.

In addition to the typical purchasing process just described, transactions can also be initiated unilaterally by any occupant layer 40 entity through pay processor hub 730. If z-pop 42 wants to transfer money to another occupant layer 40 entity, a payment 754 can be submitted without a matching invoice 756. Pay processor hub 730 will generate a notification or alert on the receiving user's phone to notify them of the received funds. In some embodiments, receiving users have the ability to accept or reject received money. Likewise, z-bpop 44, or any other occupant layer 40 entity, can submit an invoice 756 to receivables block 752 to request payment. Pay processor hub 730 will notify the user through an alert that money has been requested.

The digital wallets 740 or 742 that each occupant layer 40 entity is assigned enables individuals and business to own, manage, capitalize, and control the dissemination of their valuable private data. All private and transactional data are stored on the individual's z-pop 42 in secure blockchain storage. Local demand side entities may pay and transact with local supply side providers without having to give financial or private data other than location if required for some services. Local supply side providers receive digital payments without having the liability of requiring and accessing demand side financial, private, and personal data.

Figure 8A:
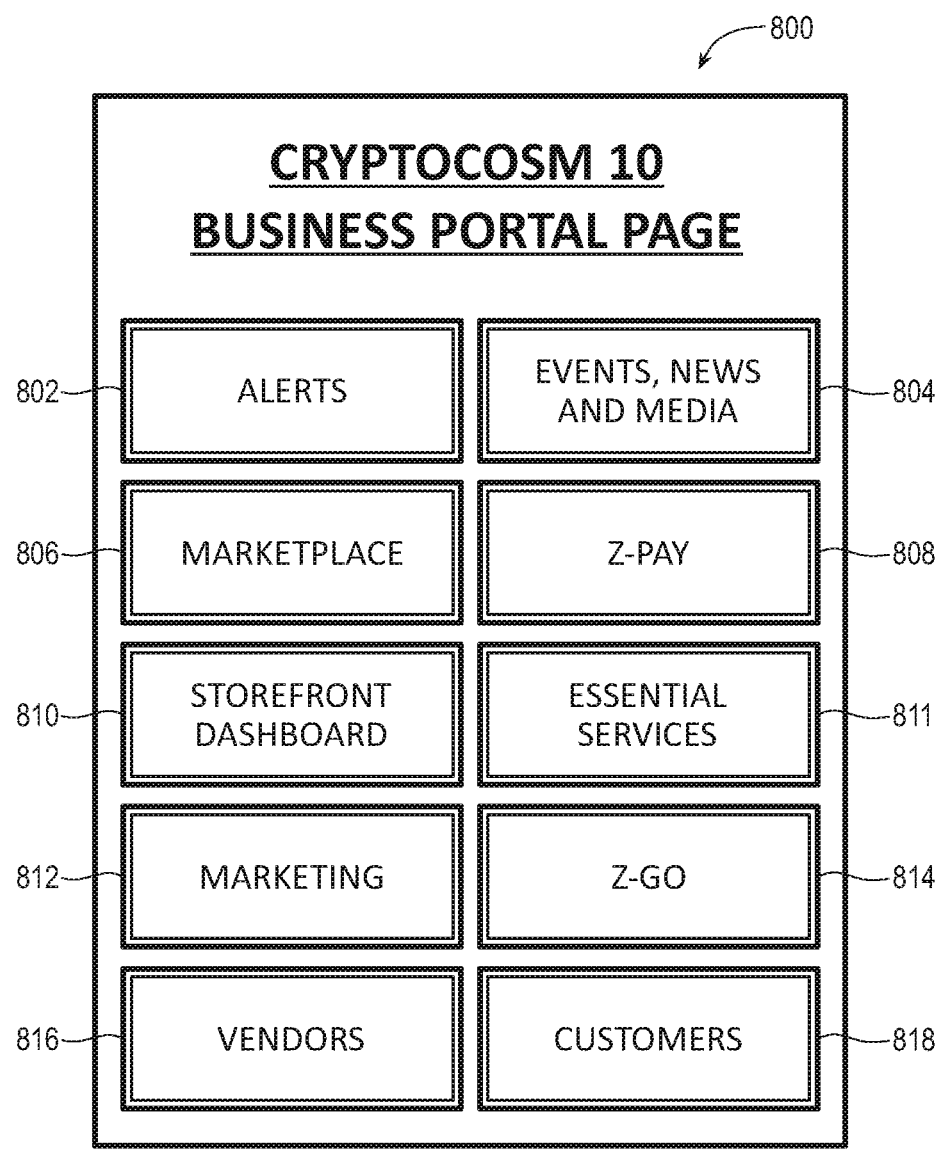
FIGS. 8a and 8b illustrate a business portal page for interacting with the cryptocosm.

Returning to FIG. 5, if a user's z-pop 42 is connected to a z-bpop 44, and the connection 46 indicates the user has a managerial, ownership, or similar relationship to the business, the user will have a button 510 on their profile page to manage their business's z-bpop 44. FIG. 8a shows an example business portal page 800, which is displayed after a user clicks or touches button 510. Business portal page is similar to personal portal page 500, but is used to interact with cryptocosm 10 via a z-bpop 44 that represents a business entity rather than a z-pop 42 that represents an individual. Business portal page 800 is each business's and essential service provider's portal to all local needs and all local customers in real time 24/7, 365. Essential service providers, government entities, and other organization profile pages would look and operate very similarly and have the same features as applicable.

Alerts button 802 operates similarly to alerts button 502, and provides any notifications or alerts relevant to the specific z-bpop 44. Events, news, and media button 804 is similar to button 504 on personal portal page 500, but showing content relevant to the business. Marketplace button 806 is similar to marketplace button 506, but allows shopping via the business account rather than personal. Shopping as a business may affect the need finder layer 50 algorithms, as being a business is part of the demand profile. In some cases, the available supply profiles are different because additional business vendors and business-to-business suppliers are made available.

Z-pay button 808 is similar to button 508, but again allows viewing and controlling a business's finances rather than an individual. Under z-pay button 808, the business manager can view outstanding payable invoices, outstanding due invoices, incoming payments, account balances, and other pertinent financial information. Storefront dashboard button 810 opens up a screen allowing the user to create and customize z-fronts 56 for the z-bpop 44. The main storefront page, products available, product pages, prices, graphics, and any other suitable aspect of the storefronts can be customized. Transacting customer interactions through cryptocosm 10 reduces pay processing, accounting, and payment expenses and allows receivables to be submitted in real time 24/7.

Essential services button 811 opens a page listing and allowing interaction with all of the essential services providers that the businesses uses. A hub structure can be used in some embodiments to provide a connection to each essential services provider in the business's essential services network. The hub would be similar to z-prop hub 330 in FIG. 3b.

Figure 8B:
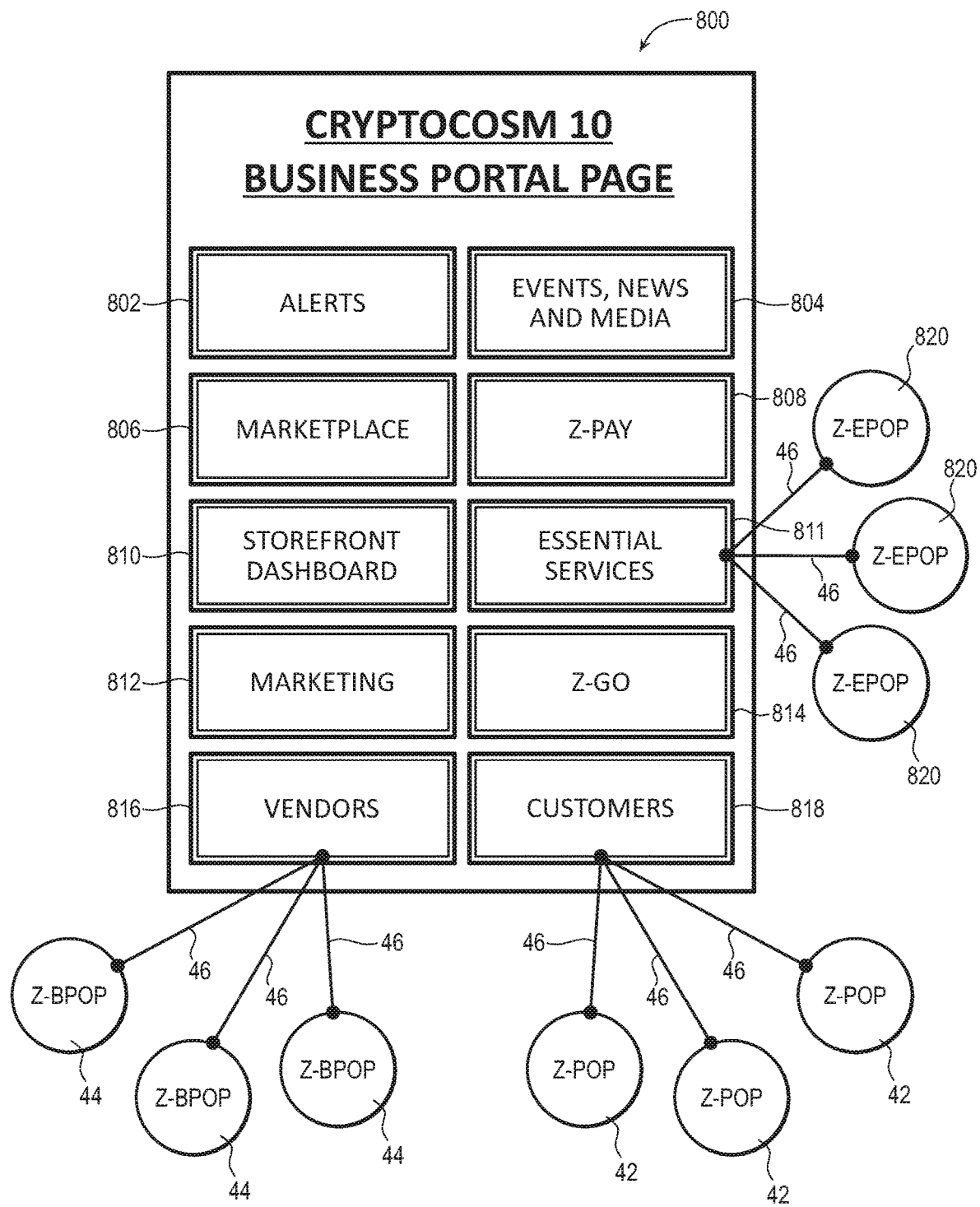

Each of the essential services is represented within cryptocosm 10 by a z-epop 820 as shown in FIG. 8b. Z-epops 820 are essential services profile pages within occupant layer 40 and stored on blockchain 450, similar to z-pops 42 for individuals and z-bpops 44 for businesses. Each z-pop 42 and z-bpop 44 will have a connection 46 to any essential service providers that the user subscribes to or that cover the geographical location of an associated z-prop 32. The connections 46 to z-epops 820 include information relevant to the relationship, such as account numbers. Clicking essential services button 811 takes the user to a screen that shows relevant essential service providers, allows contact, and shows important information such as bills due, service schedules, contact information, etc.

Marketing button 812 opens up a page that allows the business to create and execute marketing campaigns on cryptocosm 10. Advertisements can be run on certain search terms within the marketplace or promoted in the events, news, and media section. Media companies that have z-bpops 44 on cryptocosm 10 and generate media content for events, news, and media section 504, can create z-pro-s 52 supply profiles for advertising inventory. Other businesses can then purchase advertising inventory through need finder layer 50 by generating a z-pro-d 54 demand profile. Other promotional opportunities can be offered to businesses with z-bpops 44 and controlled through marketing button 812.

Z-go button 814 provides interaction with the cryptocosm 10 delivery and transportation functionality, which will be described in more detail below with regard to FIGS. 10a and 10b. Pressing z-go button 814 opens up screens that the user can use to direct deliveries of sold products, monitor the status of product deliveries, view the locations of employees who are performing delivery, transportation, or other services, and access other information related to delivery and transportation.

Vendors button 816 and customers button 818 allows the user to view and interact with the business's vendor and customer networks, respectively. FIG. 8b illustrates the business's vendor network as a group of z-bpops 44, the business's customer network as a group of z-pops 42, and the business's essential services network as a group of z-epops 820. Typically, vendors are other businesses within cryptocosm 10 used by the current user's business to provide goods or services used by the business to operate. An individual's z-pop 42 could technically be part of the vendor network if the business uses an individual as a vendor. Similarly, the customer network is typically individual z-pops 42, but the business may also have other businesses as customers. The customer network through cryptocosm 10 provides a permanent link to all local customers on a secure peer-to-peer platform.

Buttons 811, 816, and 818 allow interaction with a business's essential service, vendor, and customer networks, respectively. Within the vendor pages displayed after pressing vendors button 816, the user can view the business's purchase history with each vendor, contact vendors, place additional orders, set up recurring orders, schedule future services or product orders, and do other interactions that might be needed with vendors. Within the customer pages displayed after pressing customers button 818, the user can view purchase history of the business's customers, contact customers, view outstanding orders and upcoming service schedules, and do any other interaction with customers that might be desired.

The customer network, accessed through customers button 818, allows businesses and essential services providers to communicate on a secure peer-to-peer platform in real-time 24/7 with all local customers. Communicating through the online platform greatly reduces costly carbon producing mail having to be sent. Customer personal data, including usernames, passwords, and credit card information, is no longer in the custody of the business because all that is needed to fully communicate and transact all business is a connection 46 between the business's z-bpop 44 and each customer's z-pop 42.

Returning to FIG. 5, essential services button 511 allows the individual user to view and interact with connected essential services providers, similar to essential services button 811 for businesses. Essential services can be split into three categories: essential utilities, essential government, and essential news. Essential utilities includes traditional utilities such as electricity, gas, water, and internet, as well as property-related entities such as landlords and HOAs. Essential governments include federal and state tax organizations, city sales tax collection organizations, county property tax collection organizations, federal census bureau, and any other government organization that an individual or business entity might interact or be connected with. Essential news includes local emergency alerts, local broadcast media, local online media, and local online podcasts and blogs. In one embodiment, an individual user views relationships and interacts with essential media entities through essential services button 511, while viewing media through events, news, and media button 504.

Communities button 512 provides access to the individual user's communities. Communities are groupings of peers within occupant layer 40 that a user is connected to. The groupings are created based on some commonality between the members of the community, and can be voluntarily joined by users or automatically constructed by cryptocosm 10. The commonality between users within a community can be based on any potential common interest, such as a common political ideology, a common place of employment, fans of a specific musical artist or genre, customers of a specific business or essential service, having a common hobby, or living in geographic proximity.

Figure 9:
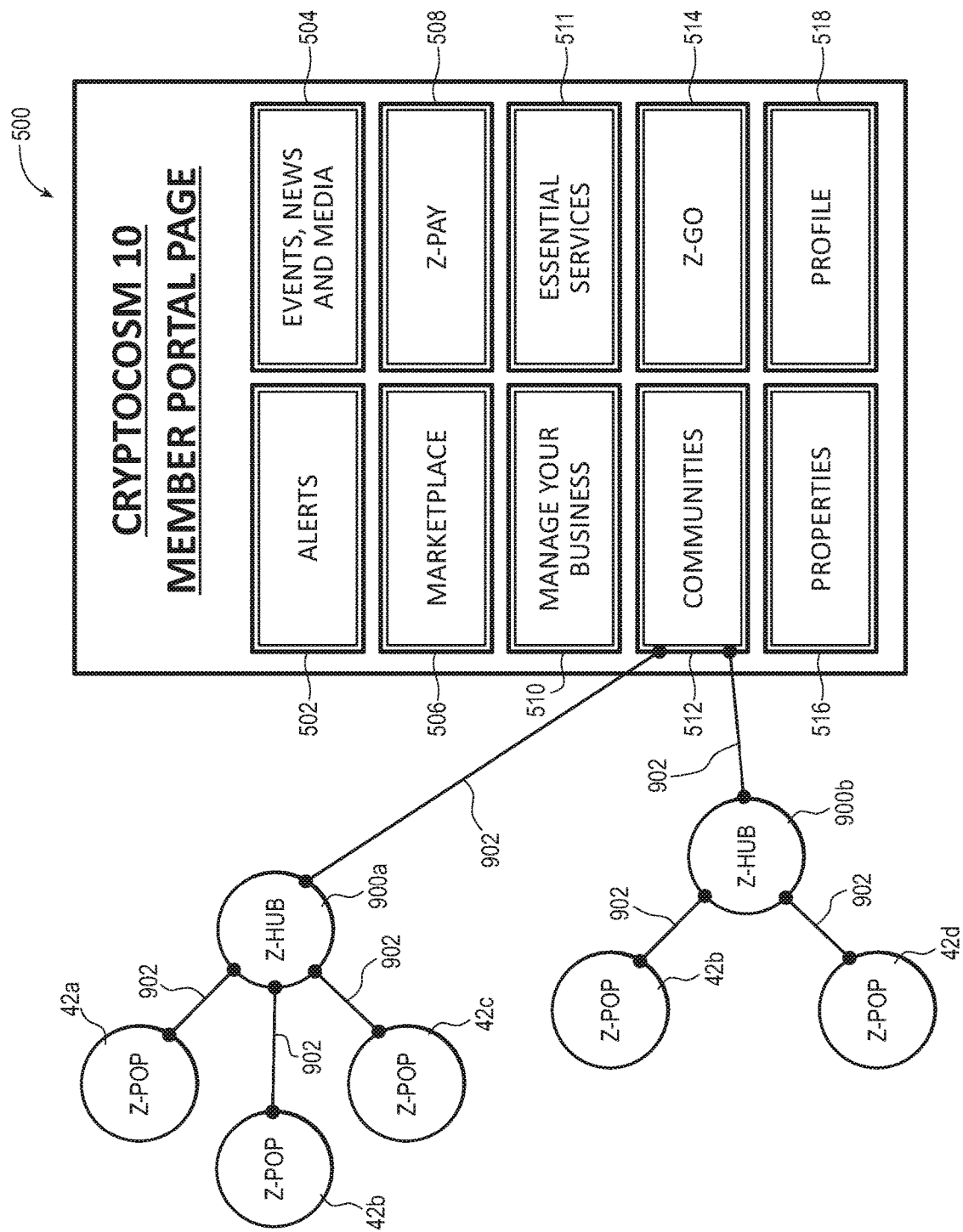
FIG. 9 illustrates hubs used to connect communities of occupant profiles.

Pressing button 512 opens up another page that allows the user to interact with communities where the user is a member or search for new communities to join. Communities are organized using z-hubs 900 as illustrated in FIG. 9. The user in FIG. 9 is a member of two different communities, and therefore has connections 902 to two different z-hubs 900a and 900b. In one embodiment, z-hubs 900 are similar to z-prop hub 330, but connect occupant layer 40 entities based on arbitrary commonalities rather than sharing a physical parcel.

Any number of other occupant layer 40 entities can have connections 902 to any given community z-hub 900. Membership in communities can be open to all members of cryptocosm 10, policed by moderators assigned the specific community, limited to only members that share the commonality as evidenced by their z-pop 42 attributes, or otherwise limited in any other suitable manner.

Returning to FIG. 5, z-go button 514 provides the user access to the delivery and transportation functionality of cryptocosm 10. On the demand side, a user can use z-go delivery functionality to have goods that the user purchases through the cryptocosm 10 marketplace delivered to their home or other location, or to have goods that they have sold delivered. A user can use z-go transportation functionality to coordinate a ride to a destination location. On the supply side, a user can voluntarily use the z-go area of the app to accept "gigs" to deliver goods from a seller to a buyer or to transport another user to their destination.

Figure 10A:
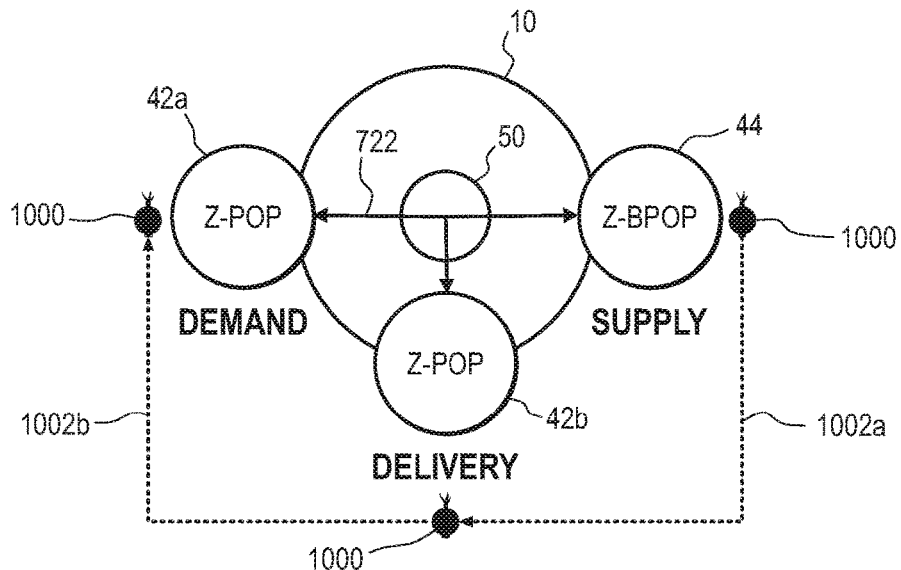
FIGS. 10a and 10b illustrate delivery and ridesharing functionality.
Figure 10B:
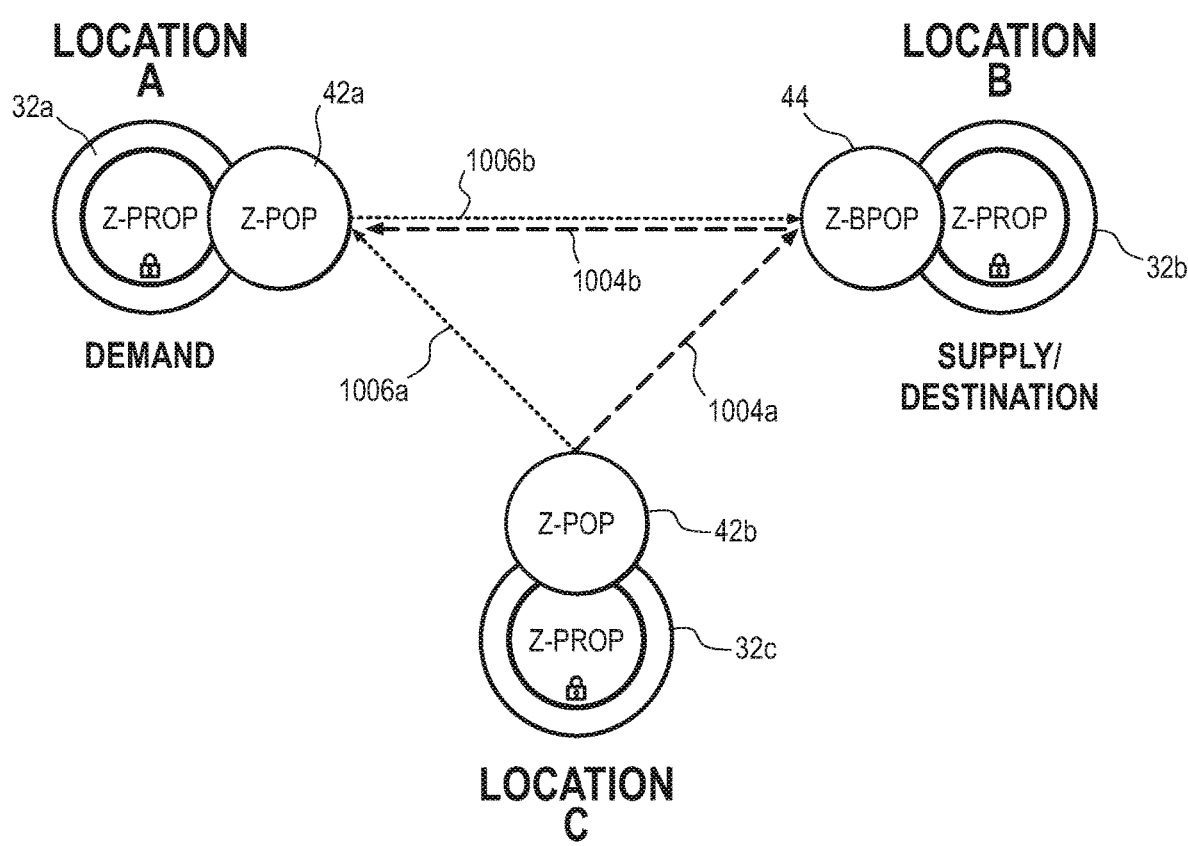

FIGS. 10a and 10b illustrate z-go functionality. FIG. 10a shows an item 1000 being delivered through cryptocosm 10. The user represented by z-pop 42a has purchased item 1000 from z-bpop 44 and desires to have the item delivered. During the checkout process, the option exists to have need finder layer 50 fulfill the delivery need automatically. The delivery need is expressed within cryptocosm 10 as a z-pro-d 54 demand profile. The z-pro-d 54 demand profile includes information regarding the pickup location, the delivery location, and attributes of the item, such as weight and size, that would affect a delivery driver's ability to deliver the item.

The delivery need is then satisfied by a fellow user of cryptocosm 10 that has a z-pro-s 52 supply profile for delivery that is compatible with the attributes of the demand profile, e.g., the delivery driver is located within a configured proximity to the item pickup location and destination and is capable of delivering the item. The proximity and delivery capability requirements of a delivery supply profile can be set based on the mode of transportation being used. A user could sign up to deliver by bicycle, in which case the maximum size and weight would be lower, and the delivery distances for matched delivery demand profiles would be less, relative to delivery using a car or truck.

Any user of cryptocosm 10 can sign up to be a delivery driver through z-go button 514, which creates a z-pro-s 52 profile for the driver and will provided gigs for the user to perform. In FIG. 10a, z-pop 42b has been identified by need finder layer 50 as the delivery person for item 1000 to z-pop 42a. Cryptocosm 10 orchestrates a pickup 1002a of item 1000 from z-bpop 44 by z-pop 42b. Pickup 1002a occurs by the user represented by z-pop 42b traveling to the location of z-bpop 44 to pick up item 1000. The cryptocosm 10 phone app opens up a map and guides the user to the location of z-bpop 44. Once the pickup of item 1000 is confirmed, the cryptocosm 10 app guides the user behind z-pop 42b to the location of z-pop 42a to perform delivery 1002b. The location for delivery of z-pop 42a can be determined by following connection 38 to a z-prop 32, and connection 28 to a z-base 24, and thereby obtaining geographic coordinates. Alternatively, the user's location can be determined by GPS coordinates or any arbitrary address can be entered as a delivery address.

FIG. 10b illustrates a geographic view of z-go functionality, with both delivery and transportation overlayed. Z-pop 42a is located at location A, defined by z-prop 32a and the z-prop's connection 28 to a z-base 24. Z-bpop 44 is located at location B, and z-pop 42b is located at location C. In delivery mode, which was just described with regard to FIG. 10a, z-pop 42b drives from location C to location B along route 1004a to pick up item 1000 from location B, and then travels along path 1004b to drop off item 1000 with z-pop 42a at location A.

Transportation mode works in an opposite order. Transportation mode of the z-go functionality involves users with z-pop 42 accounts operating as taxi cabs picking up fares through the cryptocosm 10 app. When z-pop 42b decides to start working as a transportation driver through cryptocosm 10, a z-pro-s 52 supply profile is created indicating a supply of transportation. The supply profile is created through z-go button 514 and indicates attributes such as the type of car, number of passengers, cargo capacity, location, and other relevant factors. A single z-pro-s 52 supply profile can be used to represent both a delivery and transportation supply, with the person being transported essentially being considered as a type of cargo to be delivered when matching demand profiles to the supply profiles.

When the user behind z-pop 42a needs a ride, the user opens up the app and creates a z-pro-d 54 demand profile through z-go button 514. The demand profile includes number of passengers, present location, destination, any cargo being transported, and any other relevant factors or attributes. Need finder layer 50 matches the supply profile to the demand profile and then instructs z-pop 42b to travel along path 1006a to pick up z-pop 42a. Once z-pop 42a is picked up, the cryptocosm 10 app instructs z-pop 42b to drive z-pop 42a along path 1006b to the location of z-bpop 44.

The illustrated examples involve an individual user with a z-pop 42 delivering a product from an individual to a business, or transporting an individual to a business. However, z-go functionality can also be utilized to deliver goods from an individual as well as a business, and to a business as well as an individual. In addition, the transportation or delivery services can be provided by a business on cryptocosm 10 that operates as a delivery or transportation business rather than an individual voluntarily performing the services as a gig. Z-go functionality allows any member of cryptocosm 10 to earn income by delivering goods purchased through cryptocosm 10 or by transporting other members of cryptocosm 10 between each other.

Figure 11:
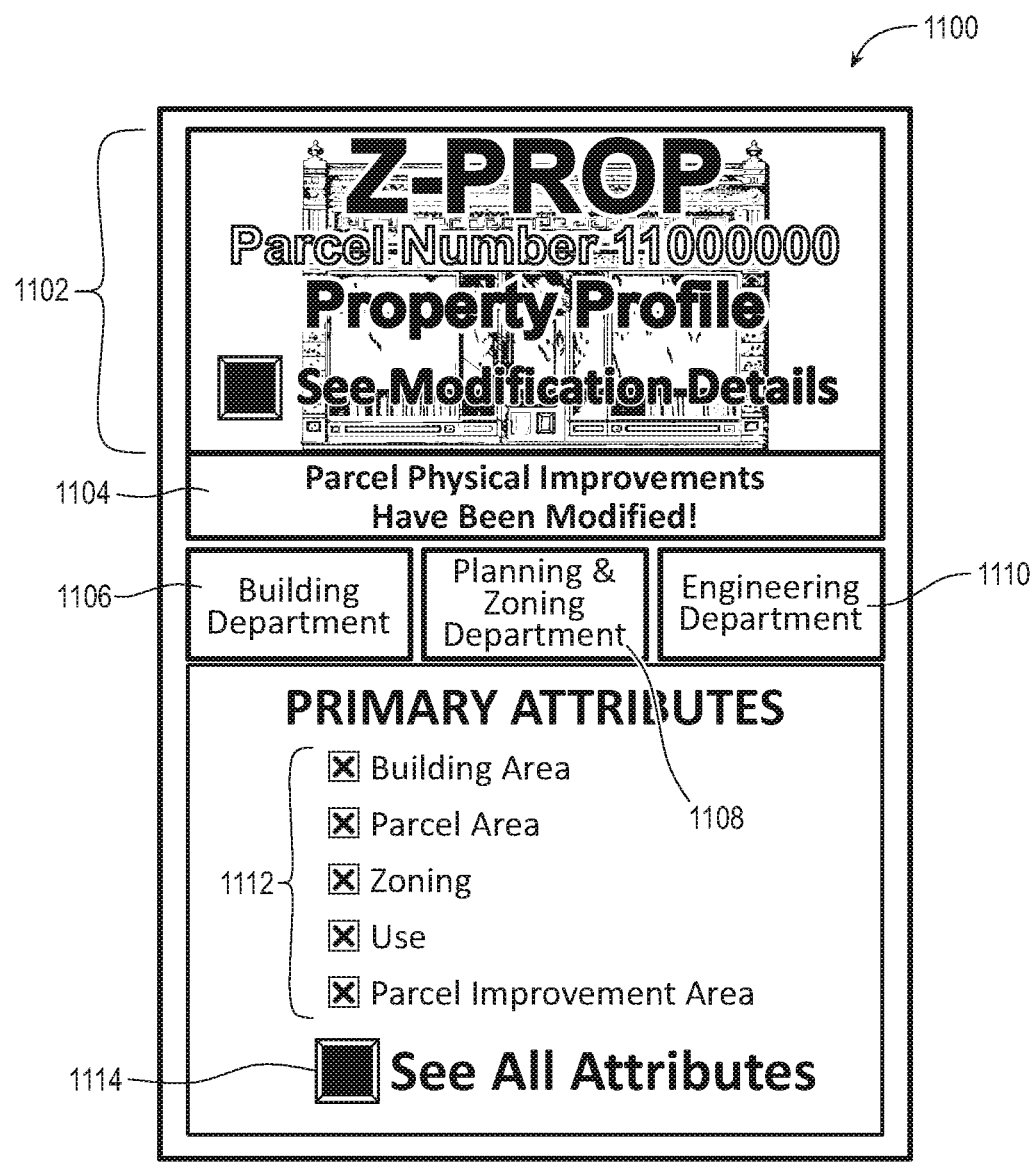
FIG. 11 illustrates a property profile page.

Returning to FIG. 5, properties button 516 allows a user to interact with any z-props 32 that are connected with the logged in z-pop 42. Pressing properties button 516 opens a list of currently connected z-props 32 with some summary information, which can then be clicked to open up individual property profiles. FIG. 11 shows an example property profile page 1100. Property profile page 1100 is a page for interaction with z-props 32, similar to how portal page 500 allows interaction with z-pops 42 and portal page 800 allows interaction with z-bpops 44.

Header 1102 of property profile page 1100 shows basic identification information of the property, e.g., parcel number as identified in county or city parcel maps. A notification section 1104 may be present if there is any recent activity related to the property. A "see modification details" button is part of notification section 1104 and can be pressed to view details related to the notification. Building department button 1106 can be pressed to be taken to a profile page for the municipal building department page, as represented as an essential service provider z-epop 820. Planning and zoning department button 1108 can be pressed to view a profile page of the municipal planning and zoning department, which is also represented by a z-epop 820. Engineering department button 1110 can be pressed to view a profile page for the municipal engineering department, again represented by a z-epop 820. Z-epop 820 profile pages are similar to portal page 800 and storefront pages 620 and 630 for z-bpops 44, but have information and interaction options relevant specifically to the municipal functions. The profile pages allow looking at potentially more detailed information, filing electronic paperwork or requests, viewing status of previous requests, viewing department maps, etc.

An attribute summary section 1112 shows a list of primary or most commonly used property attributes from the respective z-prop 32. See all attributes 1114 opens a separate page that allows a user to fully explore and view all attribute and other information stored as part of z-prop 32. Users may be able to modify the information, but some attributes may be read-only unless an update comes from an authoritative municipal body.

Returning to FIG. 5, profile button 518 show the user information about their z-pop 42 in a similar manner to how profile page 1100 shows information about their z-props 32. The profile page may be identical to sign-up page 520, and allow updating of the previously entered information. The z-pop 42 profile page shows all personal information stored on the blockchain for the user as part of z-pop 42, including all historical information available. Some information is modifiable by the user and some is read-only.

Cryptocosm 10 transforms local communities worldwide into smart and on-demand local communities by empowering the individuals to own and capitalize on their own data, and enabling the individual and local community to thrive and grow while reducing the local community carbon footprint on a user-centric, peer-to-peer, security first local cryptocosm platform.

The novel system architecture of cryptocosm 10, using multiple blockchains in combination with traditional cloud storage to store data structures for different types of entities within the system improves on prior art social and transactional networks. Having specific blockchains for specific types of entities, e.g., blockchain 300 for property layer 30 entities, a separate blockchain 450 for occupant layer 40 entities, and a separate blockchain 710 for completed transactions, allows efficient use of the blockchain and other computer resources. Using traditional cloud storage for other types of data structures within the system, e.g., parcel layer 20 and need finder layer 50, in combination with blockchains allows further optimization of computer system resources and improves performance of cryptocosm 10.

While one or more embodiments of the present invention have been illustrated in detail, the skilled artisan will appreciate that modifications and adaptations to the embodiments may be made without departing from the scope of the present invention as set forth in the following claims.

What is claimed:

1. A scalable cryptocosm platform operated by an entity, comprising:
a first data structure comprising a plurality of geographic blocks, wherein the entity generates the first data structure by reading parcel data from a database owned by a government entity for each parcel of land within a geographic boundary of the government entity, and wherein each geographic block includes a definition of a boundary for the particular parcel represented by the particular geographic block;
a first blockchain comprising a plurality of property profiles, wherein each of the plurality of property profiles includes a first connection to one of the geographic blocks; and
a second blockchain comprising a plurality of occupant profiles, wherein each of the plurality of occupant profiles includes one or more second connections, wherein each second connection links the particular occupant profile to a respective one of the property profiles, and wherein each of the second connections indicates that a particular user of the scalable cryptocosm platform represented by a particular occupant profile in the second blockchain resides at or provides services to the location of a particular geographic block represented and linked to by a particular property profile of the first blockchain.

2. The scalable cryptocosm platform of claim 1, wherein the plurality of occupant profiles includes an individual profile, a business profile, and an essential services profile.

3. The scalable cryptocosm platform of claim 1, further including a third blockchain comprising a plurality of transaction records representing transactions between the plurality of occupant profiles.

4. The scalable cryptocosm platform of claim 1, further including a hub profile connecting a plurality of occupant profiles and stored in the second blockchain.

5. The scalable cryptocosm platform of claim 1, wherein:
the first connection includes a first index of a geographic block stored as part of a property profile; and
the second connection includes a second index of a property profile stored as part of an occupant profile.

6. The scalable cryptocosm platform of claim 1, further including a cloud system comprising a plurality of supply profiles and demand profiles stored within the cloud system, wherein each of the plurality of supply profiles and demand profiles includes a third connection to one of the occupant profiles.

7. The scalable cryptocosm platform of claim 6, wherein a demand profile includes an identification of a need for transportation or delivery services.

8. The scalable cryptocosm platform of claim 6, wherein a demand profile includes an identification of a need for real estate.

9. The scalable cryptocosm platform of claim 1, further including:
a first cryptographic key used to encrypt a first occupant profile; and
a second cryptographic key used to encrypt a second occupant profile.

10. The scalable cryptocosm of claim 9, further including a transaction record encrypted using the first cryptographic key and second cryptographic key.

11. A method of making a scalable cryptocosm platform, comprising:
acquiring geographic data for a geographic region by reading parcel data from a database owned by a government entity;
converting the geographic data into a plurality of geographic blocks stored digitally, wherein a separate geographic block is created for each parcel of land within a geographic boundary of the government entity, and wherein each geographic block includes a definition of a boundary for the particular parcel represented by the particular geographic block;
creating a plurality of property profiles, wherein each of the property profiles includes a first connection to one of the plurality of geographic blocks;

storing the plurality of property profiles in a first blockchain;
providing a plurality of occupant profiles, wherein each of the occupant profiles includes one or more second connections, wherein each second connection links the particular occupant profile to a respective one of the plurality of property profiles, and wherein each of the second connections indicates that a particular user of the scalable cryptocosm platform represented by a particular occupant profile in the second blockchain resides at or provides services to a particular geographic block represented and linked to by a particular property profile of the first blockchain; and
storing the plurality of occupant profiles in a second blockchain.

12. The method of claim 11, further including:
providing a sign-up page for occupant entities; and
generating the plurality of occupant profiles in response to a plurality of occupant entities utilizing the sign-up page.

13. The method of claim 11, further including:
generating a supply profile connected to a first occupant profile and comprising a first plurality of attributes;
generating a demand profile connected to a second occupant profile and comprising a second plurality of attributes; and
matching the supply profile to the demand profile by comparing the first plurality of attributes to the second plurality of attributes.

14. The method of claim 13, further including:
providing a payments block;
receiving a payment detail from the second occupant profile; and
using the payments block to transfer funds from the second occupant profile to the first occupant profile without providing the payment detail to the first occupant profile.

15. The method of claim 14, further including:
providing an account ledger block; and
communicating a transaction data between the first occupant profile and second occupant profile through the account ledger block.

16. The method of claim 15, further including storing the transaction data in a third blockchain using an encryption key of the first occupant profile or second occupant profile.

17. The method of claim 13, further including:
generating a plurality of supply profiles;
matching the plurality of supply profiles to the demand profile; and
displaying the supply profiles in order of closest geographic proximity from the demand profile based on the geographic locations of the property profiles connected to the same respective occupant profiles as the supply profiles and demand profile.

18. The method of claim 13, wherein the supply profile indicates a supply of transportation or delivery services.

19. The method of claim 11, further including creating the plurality of occupant profiles after creating the plurality of property profiles.

20. The method of claim 11, further including creating the plurality of occupant profiles by generating a barcode with all necessary information required to create one of the occupant profiles embedded within the barcode.

21. The method of claim 11, further including:
generating a first occupant profile of the plurality of occupant profiles as an individual profile;
generating a first instance of the second connections to link the individual profile to a first property profile, wherein the first instance of the second connections indicates that the user represented by the individual profile resides at the parcel represented by the first property profile;
generating a second occupant profile of the plurality of occupant profiles as an essential services profile;
generating a second instance of the second connections to link the essential services profile to a second property profile, wherein the second instance of the second connections indicates that an essential services entity represented by the essential services profile resides at or operates out of the parcel represented by the second property profile; and
generating a third instance of the second connections to link the essential services profile to the first property profile, wherein the third instance of the second connections indicates that the essential services entity represented by the essential services profile provides services to the parcel represented by the first property profile.

22. The method of claim 21, further including generating a third connection to link the individual profile to the essential services profile and thereby indicate that the user represented by the individual profile utilizes services provided by the essential services entity.

23. The method of claim 11, further including periodically monitoring the government entity database and updating the property profiles within the first blockchain with any information that has been updated in the government entity database and different from information currently stored in the second blockchain.

24. The method of claim 11, further including storing the plurality of geographic blocks in the first blockchain.

25. The scalable cryptocosm platform of claim 2, wherein:
the individual profile includes a first instance of the second connection to a first property profile of the first blockchain to link the individual profile to the first property profile and thereby indicate that the user represented by the individual profile resides at the parcel represented by the first property profile;
the essential services profile includes a second instance of the second connection to a second property profile of the first blockchain to link the essential services profile to the second property profile and thereby indicate that an essential services entity represented by the essential services profile resides at or operates out of the parcel represented by the second property profile; and
the essential services profile includes a third instance of the second connection to the first property profile of the first blockchain to link the essential services profile to the first property profile and thereby indicate that the essential services entity represented by the essential services profile provides services to the parcel represented by the first property profile.

26. The scalable cryptocosm platform of claim 25, further including a third connection to link the individual profile to the essential services profile and thereby indicate that the user represented by the individual profile utilizes services provided by the essential services entity.

27. The scalable cryptocosm platform of claim 1, wherein the property profiles of the first blockchain are limited to only parcels within the geographic boundary of the government entity.

28. The scalable cryptocosm platform of claim 1, wherein the first data structure is stored on the first blockchain.

\* \* \* \* \*